United States Patent [19]

Rembos

[11] Patent Number: 4,962,941

[45] Date of Patent: Oct. 16, 1990

[54] WHEELCHAIR APPARATUS

[76] Inventor: Steven N. Rembos, 790 S. Park Rd., Hollywood, Fla. 33021

[21] Appl. No.: 327,049

[22] Filed: Mar. 22, 1989

[51] Int. Cl.[5] .......................... A61G 5/06; B62B 5/02; B62B 9/02

[52] U.S. Cl. .................................... 280/5.22; 180/8.2; 280/DIG. 10; 297/DIG. 10

[58] Field of Search .................... 280/5.2, 5.22, 304.1, 280/DIG. 10, 47.371; 180/9.22, 8.2; 188/166, 167; 74/551.9, 544; 297/DIG. 10

[56] References Cited

U.S. PATENT DOCUMENTS

| | | | |
|---|---|---|---|
| 1,155,916 | 10/1915 | Grout | 74/544 X |
| 3,178,193 | 4/1965 | Grogan | 280/5.22 X |
| 4,360,213 | 11/1982 | Rudwick et al. | 297/DIG 4 X |
| 4,556,229 | 12/1985 | Bihler et al. | 280/5.22 |
| 4,566,706 | 1/1986 | Bihler et al. | 280/5.22 |

FOREIGN PATENT DOCUMENTS

| | | | |
|---|---|---|---|
| 1046444 | 7/1963 | United Kingdom | 280/5.22 |

*Primary Examiner*—Charles A. Marmor

*Assistant Examiner*—Alan M. Kager

*Attorney, Agent, or Firm*—Stephen A. Litchfield

[57] ABSTRACT

Apparatus for use on standard or customized wheelchairs for providing means by which the wheelchair and occupant may be moved up or down a stairway or curb with a minimum of inconvenience to the occupant of the chair and to the handler of the chair. The apparatus having a pair of mounting brackets attached to the side frame of the chair with a tread assembly adjustably positioned thereon at a select angle to the mounting brackets. The tread assembly having a series of rollers over which a tread is placed so that the tread will interact with the stairsteps or curb to allow the wheelchair to glide up or down the stairsteps or curb without experiencing the bumps commonly associated with rolling a wheelchair up or down a set of stairs or curb. The apparatus has a brake assembly and extension handlebars allowing the operator of the chair to control the chair and the speed upon which the chair ascends or descends the stairs. The apparatus is removable from the chair when not in use.

24 Claims, 12 Drawing Sheets

WHEELCHAIR APPARATUS

BACKGROUND OF THE INVENTION

This invention relates in general to the field of medical devices and apparatus and in particular to a wheelchair apparatus for assisting the wheelchair and occupant thereof, with the help of at least one wheelchair attendant, to ascend or descend a stairway or curb.

Conventional wheelchairs have two large rear wheels rotatably mounted beneath a vertical side frame member of a standard wheelchair and two caster wheels mounted to another rail or fork on the front of the wheelchair assembly. Conventional wheelchairs as presently manufactured do not provide for safe and "bump free" use by an occupant of the chair to ascend or descend stairways. In order for a standard design chair to be used in the transporting of an occupant up or down a stairway, the chair must be tipped backward, with the occupant in it, by a handler or attendant of the chair and then slowly lowered or raised, one step at a time on the stairway. Safe practice generally dictates that a second attendant should grasp the front caster wheels or frame of the chair and walk with the chair as the chair and occupant are raised or lowered on a stairway. Due to the size of the rear wheel, the wheelchair must be slowly lifted or lowered one stair at a time and in a manner that causes the occupant to be jolted or bumped as the wheels pass to the next step. This can cause severe discomfort to older occupants of a chair as well as individuals and persons suffering from injury or other trauma, and can cause damage to the chair as well. Further, using the standard wheelchair assembly to ascend or descend a stairway is time consuming and places the occupant at risk of injury due to the difficulty of a handler to control the chair on the stairway, particularly on a long stairway. Due to the large diameter of the rear wheel the wheelchair occupant is balanced precariously on each step as the chair is raised or lowered on the stairway. Also with the standard wheelchair the handler must bend over the chair at an uncomfortable angle when the chair is tipped backwards on the stairwell. This leads to an uncomfortable experience for the handler as well as an increased risk to the safety of the wheelchair occupant.

Many wheelchair-bound persons, due to the difficulty of ascending or descending stairways and curbs, are prevented from gaining access to buildings and to the upper levels of multi-story buildings. Not only does this affect their mobility, but it also affects their ability to gain employment since many employers do not want to cope with a wheelchair-bound employee who cannot freely move from one floor to another in a place of employment. Also, hospitals, nursing homes and other multi-story patient care facilities must rely on elevators to move wheelchair-bound patients from one floor to another due to the difficulty of negotiating a stairway. Medical transport services which often transport sick, invalid, obese or elderly patients have difficulty in transporting such patients in a standard wheelchair. Extreme difficulties have been encountered in the patients' homes where the wheelchair-bound person must be raised and lowered along a narrow stairwell. In many cases this prevents such a person from utilizing their whole house and forces them to live on only one floor of a multi-story dwelling.

Attempts have been made in the past to provide means for ascending or descending stairs in a wheelchair in a manner that would not place the occupant at such risk of harm or jolt the occupant as the chair is raised or lowered up the stairs. The patent to Locke, U.S. Pat. No. 3,146,841, illustrates one such device. This patent shows a non-conventional chair assembly having a large wheel in the front of the chair and the small caster wheel in the rear. The Locke, '841 patent discloses a device which clearly cannot be assembled to a standard wheelchair, appears to not be removable, is cumbersome to manufacture and not otherwise practical. Further, the Locke device does not provide for the wheelchair to be tipped backwards, as with conventional chairs, prior to ascending or descending a stairway. This makes it very difficult for a handler of the chair to control it as it goes up or down a stairway. Another patent to Locke, U.S. Pat. No. 3,111,331, illustrates the same type of invention with the same disadvantages as previously mentioned.

In the patent to Studer, U.S. Pat. No. 4,401,178, a wheelchair apparatus is shown which provides an extensive and cumbersome means for ascending or descending stairs. The assembly shown in the Studer patent is obviously expensive to manufacture and would be prohibitive in price for the average user of a wheelchair to have as an accessory to the chair.

The patent to Weyer, U.S. Pat. No. 3,231,290, illustrates another device which is cumbersome and will interfere with the chair when it is not in use. Further, it is not clear whether the standard chair is able to be adapted to receive the Weyer device.

The patent to Hale, et al., U.S. Pat. No. 3,276,531, illustrates a vehicle for invalids which does not show an apparatus connected to a standard chair. Indeed, the entire apparatus of the Hale patent is extremely complex and obviously very expensive to manufacture and sell.

Runner assemblies have been used in other areas not relevant to wheelchairs for lifting loads up and down stairs. Previously, appliance trucks, often called dollies, have had runners attached thereto with a track and rollers thereon for assisting in lifting the loaded dolly up and down stairs. The runners are designed to span the length of only one stair at a time, generally causing them to "bump" and "jolt" as the dolly is raised or lowered on the stairway.

All of the above embodiments for wheelchairs in assisting movement up or down a set of stairs have numerous disadvantages and problems. Most are cumbersome, heavy, do not connect to a standard wheelchair as presently manufactured in the United States, are expensive to manufacture, and restrict the movement of the chair both when the apparatus is in use and not in use. It is felt that due to these limitations the existence of a device for assisting a wheelchair up and down stairs has not been forthcoming.

The need for such a device is clear. Most hospitals, nursing homes and other multi-story buildings in a fire situation or other hazard by law must shut down the elevators. In a multi-story building during a fire, with the elevators inoperable, residents must use stairways to exit the building. In so doing, particularly for wheelchair-bound invalids, there is a risk of injury, and great delay in removing them from the building in a safe and efficient manner. This delay will also affect the ability of other building occupants to exit the building quickly and safely and may increase the risk of an overall panic where people are needlessly injured or killed. Current fire escape plans for many of these buildings involve placing a wheelchair-bound patient in a blanket and having four people, each carrying a corner of the blanket, remove the patient from the building. This method depends on the availability of four people strong enough to carry such a patient and ignores the possible need for life sustaining equipment to be carried along with the patient. It is felt that the current state of emergency exit plans for most nursing homes and hospitals would expose many of the wheelchair-bound and invalid patients to extreme danger in a fire.

The average person that is wheelchair-bound must, on a daily basis, struggle with buildings, including his or her home, and building entrances which are not constructed for wheelchair use. Many of these structures have stairway entrances as the only way to get in or out of the building and generally, all structures that are multi-story have stairwells. Often these buildings do not have an elevator system and occupants of the buildings have no choice but to use the stairs. In the past, these buildings have been inaccessible to handicapped, wheelchair-bound people. With the standard wheelchair, or with any of the above-mentioned apparatus, great effort is needed to enable such a person to gain entrance or exit from such a building, or any of its upper stories. In some buildings a wheelchair-bound person is discouraged from visiting the upper stories of a building due to the difficulty in getting such a person there. Thus, there is a need in the field for a wheelchair apparatus which is lightweight, portable, and quickly and easily attachable and detachable to a standard wheelchair with a minimum of tools; and which can be easily modified and customized for use in assisting a wheelchair-bound person to ascend or descend a set of stairs in a reasonably safe and efficient manner. Further, there is a need in the field for a wheelchair apparatus to assist a wheelchair-bound individual to ascend or descend a stairway that does not restrict the normal movement of the chair when the device is both in use and not in use and also does not restrict the chair from collapsing to its storage mode. Further, there is a need in the field for a wheelchair apparatus to assist in ascending or descending a stairway which is affordable by most wheelchair-bound persons.

To satisfy these needs, it is an object of the present invention to provide a wheelchair apparatus that is attachable directly to a standard design wheelchair with a minimum of modification to the chair itself. It is a further object of the present invention to provide an apparatus for a wheelchair to assist in ascending or descending a stairway and which will not interfere with the operation of the chair both when the apparatus is in use and not in use. It is another object of the present invention to provide an apparatus for a wheelchair where said apparatus is removably affixed to the chair such that when the apparatus is not in use it may be removed from the chair and stored if desired. It is an additional object of the present invention to provide an apparatus to be attached to a wheelchair to assist an occupant of the chair in ascending or descending a stairway where said apparatus will not interfere with the collapsing of the chair to its storage position when the chair is not in use. It is another object of the present invention to provide a wheelchair apparatus which will allow a wheelchair to be moved up or down a stairway when said chair has an occupant in it without causing the occupant to be bump or jolted as the chair moves from one step to another. It is an additional object of the present invention to provide a lightweight easily manufactured and affordable wheelchair apparatus assembly to fit to a chair of a standard design which will provide a safe and smooth means by which the wheelchair and occupant may be raised or lowered on the stairway.

These objects are satisfied so as to overcome the disadvantages of the prior art through the present invention as described below. Further objects and advantages of the invention will in part become apparent as the following description proceeds. The features of novelty which characterize the invention will be pointed out with particularity in the claims next to and forming a part of the specification.

SUMMARY OF THE INVENTION

According to one aspect of the invention, an improved stair climbing or descending wheelchair apparatus is provided. The invention described herein is intended to be assembled on a new or existing standard or custom wheelchair as is presently or has been previously manufactured in the United States. The present invention entails a minimum of modifications to the standard chair and as such may be added either as a kit to an existing wheelchair that has already been purchased by a user or may be added as an accessory by a manufacturer of wheelchairs.

A standard wheelchair has a rear vertical member along of the side frame. This rear vertical member comprises the rear frame to which the handlebars of the chair are formed, as well as the axle for the rear large wheels of the chair. In the practice of the present invention, attached to each rear vertical side member is a mounting bracket. The mounting bracket intersects the axle through an axle cut-out contained in the bracket and attaches to the rear vertical member by virtue of either screws which may be used in an after market kit application, or by rivets (or welds) if used during factory manufacture. The mounting bracket is substantially rectangularly shaped and bolts to both the rear vertical side frame and the rear tipping lever rail of the wheelchair.

The mounting bracket has removably attached thereto a pivot bracket and a positioning bracket each of which are connected to a tread assembly which comprises an elongated pair of face plates mounted by virtue of axle pins at each end and having connected therebetween a series of rollers and a continuous tread such that the rollers and tread cooperate with the face plates and axles to allow the tread to rotate around the face plate. The pivot bracket is removably connected to the mounting bracket, as is the positioning bracket. The positioning bracket allows the elongated tread assembly to be shifted forward out of the way of the chair, towards the rear vertical side frame when not in use. Each rear vertical side frame of the wheelchair has a separate mounting bracket mounted thereto. Thus, when fully assembled the apparatus has a pair of elongated tread assemblies mounted in parallel to the interior sides of the vertical side frames and adjacent each of the large rear wheels of the chair. Connected to the tread assembly is a brake mechanism which is joined by a brake cable to the extension handles of the wheelchair. A traditional brake lever allows an operator of the chair to control the descent or ascent of the chair through the operation of the brake. Extension handles project out of the standard hand grips of a standard wheelchair and at an angle thereto such that the handler or attendant of the chair, when the chair is in use ascending or descending a stairway, is better able to control the chair using the aforedescribed apparatus. This avoids having the handler having to bend over the chair at an uncomfortable angle, as with a standard chair, when it is tipped backwards. Furthermore, the extension handles significantly increase the strength and ability of the handler in transporting the wheelchair-bound person thereby resulting in increased safety for both the operator and the wheelchair occupant. The hand brakes are positioned on these extension bar handles. The extension bar handles are removable by virtue of a spring loaded pin assembly which connects and locks the extension bar handles to the hand grips of the wheelchair.

When in use, the elongated tread assembly is moved by virtue of the positioning bracket to its "use" position and the chair is tipped backwards by the handler of the chair. With the occupant of the chair resting securely in the chair, the handler then moves the elongated tread assembly over the stair and allows the tread assembly to move along the stair edges letting the chair and occupant ascend or descend the stairway as desired. The tread assembly is designed so that it will span at least two stairsteps at a time. This helps reduce the "bumping" and "jolting" commonly experienced when a standard chair is moved up or down a stairway. When the apparatus is in use on a stairway, a second attendant should also be in front of the chair and holding the chair by its front caster wheels. By depressing the hand brake the brake is released allowing the tread to move freely and thus move the occupant and the chair along the stairway. By releasing the brake lever, the brake is engaged on the tread and the movement of the chair is stopped.

The positioning bracket is operated by a locked assembly comprising a handle locked in a spring and bracket. These parts interact to allow the positioning bracket to move with respect to notches on the mounting bracket. One notch is a storage notch which positions the elongated tread assembly in a vertical position, out of the way of the operating components of the wheelchair. When desired to be used, the handle is lifted drawing the locking pin out of the storage notch and allowing the positioning bracket to move along the upper edge of the mounting bracket to a second notch in the mounting bracket which then positions the elongated tread assembly for use.

When the subject invention is not in use it may either be positioned in the storage notch on the mounting bracket, which will not interfere with the use of the chair or due to the removable feature of the pivot bracket and the positioning bracket, the entire tread assembly, including the extension handles may be removed from the chair. The handle extension bars are also easily removed by depressing the locking pin on the hand grips. Both handle extension bars fit on clips provided along the face plate of the elongated tread assembly to allow for easy handling and storage. The mounting bracket is the only piece of the subject invention that remains with the wheelchair when the apparatus is disassembled. The mounting brackets, one on each interior side of the rear vertical frame of the wheelchair, do not interfere with the use of the chair or the collapsibility of the chair when the chair is not in use.

Thus, it is seen that a means has been provided by which a standard wheelchair may be modified, or manufactured, with an apparatus that will allow an occupant of the chair, with a handler, to ascend or descend a stairway with a minimum of inconvenience or bumps. Further, the subject invention is easy to manufacture and relatively inexpensive when compared to the alternatives as evidenced by the aforementioned prior art. It is felt that the invention is of such a nature that it would be affordable by the average wheelchair occupant and by nursing homes and hospitals to assist in moving patients from one floor to another on a stairway. Further, the subject invention will provide means by which handicapped and invalid patients may be efficiently and safely removed from a multi-story building down a stairway in the event of a fire or other hazard. The subject invention may be practiced by a single handler of a wheelchair and occupant on a stairway, if necessary, in an emergency, however, as previously mentioned, it would appear that having one handler to operate the extension bar handgrips with another attendant in front of the chair to steady the chair as it is raised or lowered on the stairway would be the safest means to employ the invention described herein.

It is felt that the subject invention meets the objects as exPressed herein as the apparatus is easily attachable and detachable to a standard wheelchair with a minimum of modification to the chair. Further, when properly used, the subject invention provides a means by which a wheelchair-bound person may be raised or lowered along a stairway in a reasonably safe and efficient manner. Further, the subject invention does not restrict the normal movement of the chair when the device is either in use or not in use and also does not restrict the chair from collapsing to its storage mode. The subject invention is relatively lightweight compared to the weight of the chair and provides a means by which an occupant of the chair may be raised or lowered on a stairway without suffering the "jolts" or "bumps" commonly experienced with the present method of raising or lowering a person on a stairway.

BRIEF DESCRIPTION OF THE DRAWINGS

Features of the present invention which are believed to be novel are set forth with particularity in the appended claims. The invention together with further objects and advantages thereof, may best be understood by reference to the following description taken in conjunction with the accompanying drawings, and the several figures of which like reference numerals identify like elements, and in which:

DETAILED DESCRIPTION

Figure 1:
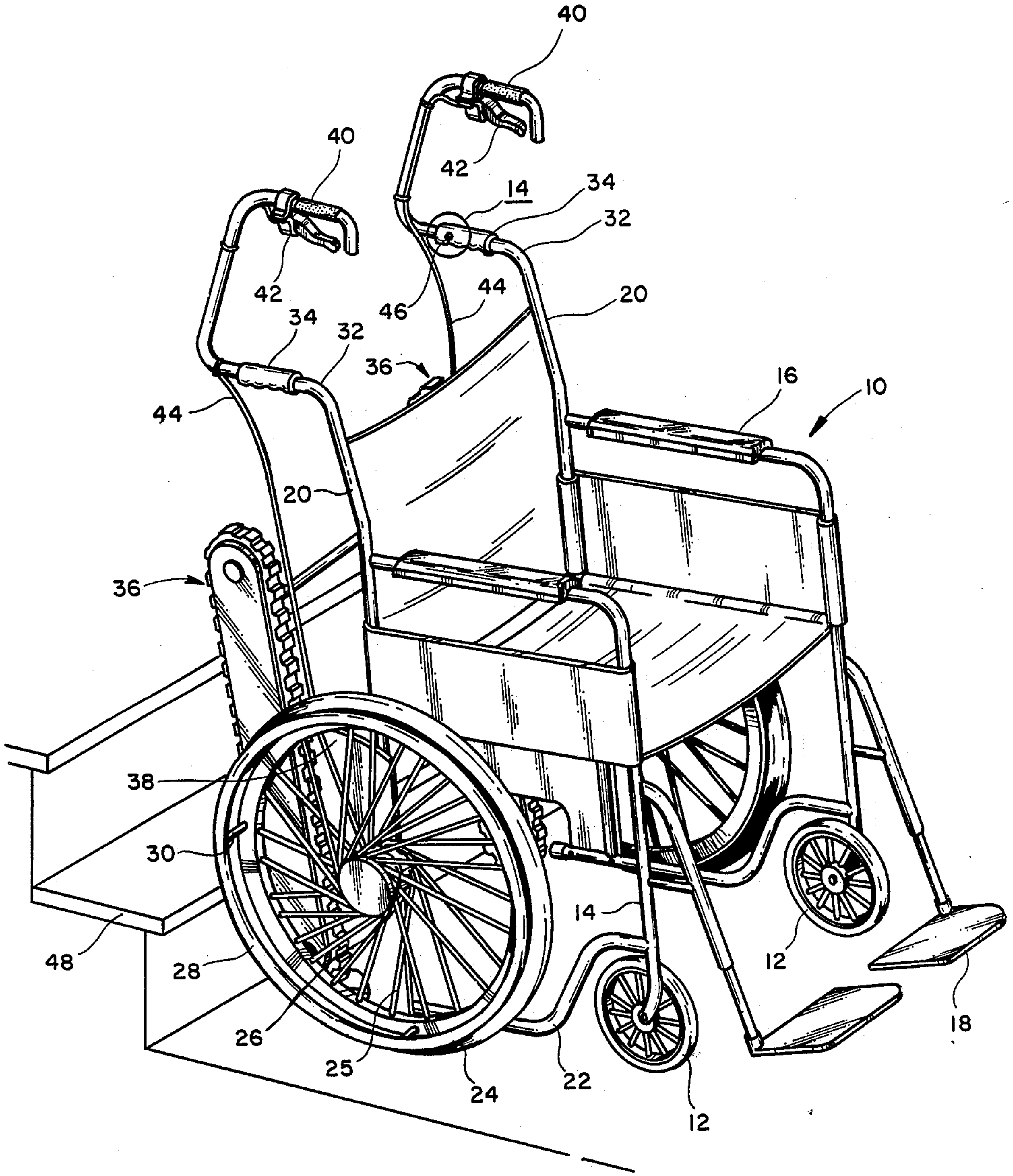
FIG. 1 is a side perspective view of a standard wheelchair having the subject invention attached thereto.

Whereas the invention described herein may be implemented on wheelchairs of various types it is shown and described as applied to a standard type wheelchair as shown in FIG. 1. FIG. 1 illustrates a standard wheelchair 10 having front caster wheels 12 connected to front forks 14 which forms a part of wheelchair arms 16. Also connected to front forks 14 are the footrest assemblies 18. The rear side frame 20 of the chair 10 has front rail 22 connected to the vertical member of side frame 20. This connection is better shown in FIG. 2. Referring still to FIG. 1, large rear wheels 24 are rotatably connected at axle 26 to the rear side frame 20. Large rear wheels 24 have hand rail 28 connected thereto by virtue of a series of spacers and clips 30 and spokes 25 mounted between wheel 24 and axle 26. The spacers provide the necessary distance between rear wheel 24 and hand rail 28 so that an occupant of the chair can self-motivate himself by using the handrail to roll the large rear wheels 24 of chair 10. Arm rests 16 may or may not be removable depending on the type and manufacture of the chair 10. Also formed along side rear side frame 20 are handlebars 32 having hand grips 34 joined thereon. These handgrips 34 are normally what an attendant or handler of the chair 10 would grip to assist an occupant of the chair 10 in moving the chair 10 from one place to another.

The present invention is shown in FIG. 1 attached to chair 10. The invention comprises track assembly 36 attached by virtue of a mounting bracket 38 to the rear side frame 20 of chair 10. Handlebar extensions 40 are shown inserted into the handlebars 32 and project outward therefrom. Attached to handlebar extensions 40 is brake lever 42 having brake cable 44 connected thereto and joining with a brake assembly not shown in FIG. 1. Pin assembly 46 is shown in FIG. 1 and is used to connect handlebar extensions 40 to the handlebars 32.

Stairwell 48 is shown in FIG. 1 adjacent the wheelchair 10 and track assembly 36 to illustrate the approximate length of track assembly 36 with respect to the individual stairsteps 48.

Figure 2:
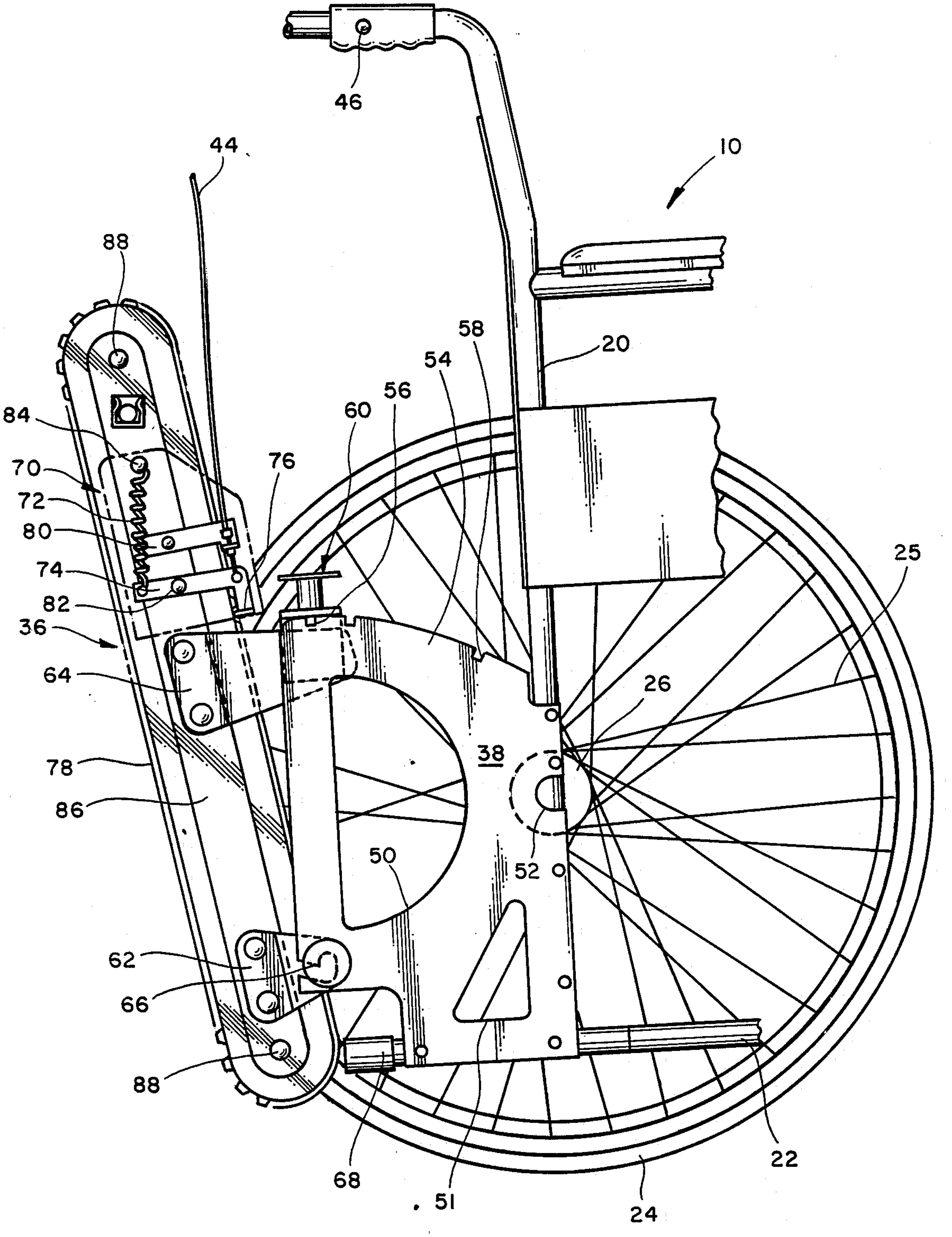
FIG. 2 is an interior side view of the subject invention attached to one wheel and frame of a standard wheelchair. The elongated tread assembly is shown attached to the mounting bracket which in turn is attached to a standard wheelchair. Said tread assembly is attached and pivoted towards the use position of the present invention.

FIG. 2 illustrates in side view the track assembly 36 and its attachment to the rear side frame 20 of wheelchair 10. One of the main features of the present invention is the mounting bracket 38 which is shown riveted to the rear side frame 20 along the vertical member thereof adjacent where the front rail 22 joins the vertical member of rear side frame 20. FIG. 2 also shows the left-most rear wheel 24 in relation to the positioning of the left-most track member 36. Mounting bracket 38 is substantially rectangularly shaped having cut-out portions 50 and 51. These cut-out portions are in mounting bracket 38 for the purpose of reducing the overall weight of the assembly. It can be seen that mounting bracket 38 has a cut-out portion 52 designed so that the mounting bracket 38 will fit over the axle 26 of rear wheel 24. This helps provide for further support of the mounting bracket 38 when connected to chair 10. Mounting bracket 38 has upper section 54 which is slightly curved and has two notch positions formed therein. Notch position 56 provides a position for which the track assembly 36 is pivoted to the desired use position. Notch position 58 provides a position which track assembly 36 may be pivoted to when it is stored on the chair 10. Notch positions 56 and 58 interact with latch assembly 60 so as to provide a means by which track assembly 36 may be pivoted from the use position to the storage position. Other notch positions could be added along upper section 54 to allow for adjusting the track assembly 36 to different angles if desired.

Track assembly 36 is shown in FIG. 2 joined to mounting bracket 38 by virtue of pivot bracket 62 and positioning bracket 64. Positioning bracket 64 also has the latch assembly 60 secured thereto. It should be noted that pivot bracket 62 fits within cutout section 66 of mounting bracket 38 so as to enable the track assembly 36 to be removed from mounting bracket 38 when the entire assembly is desired to be removed from chair 10. While the entire track assembly 36 may be removed from chair 10 the mounting bracket 38 is intended to remain on the chair once the bracket has been installed, however, by using nuts and bolts to secure the mounting bracket 38 to rear side frame 20 and front rail 22, bracket 38 may also be removable. As mentioned earlier, the subject invention may either be assembled on a standard wheelchair during the manufacture of the chair or may be added to a standard wheelchair as a kit after manufacture and sale of the chair as an after market item. It should be noted that mounting bracket 38 is designed so as to not interfere with tipping lever 68 on front rail 22 and thus will not interfere with the tipping backwards of the chair.

FIG. 2 shows brake cable 44 connecting with the brake assembly 70. Brake assembly 70 comprises brake spring 72 connected to brake lever 74 which is pivotally attached to the track assembly 36. Brake lever 74 has brake 76 formed thereon to interact with the tread 78 of track assembly 36. Stationary bar 80 positions the brake cable 44 with respect to brake lever 74 and spring 72 so as to allow the pivoting of brake lever 74 when the brake lever 42 on the handlebar extensions 40 is depressed, raising and thereby releasing the brake. It should be noted that in the present design when the brake lever 42 on the handlebar extensions 40 is not depressed, brake lever 74 and brake 76 are in a locked position adjacent tread 78. Thus, the brake is always on and locked preventing movement of the tread 78 on track assembly 36. This means that unless the brake lever 42 on handlebar extensions 40 is depressed, the chair 10 will not glide up or down a stairway. Only by depressing brake lever 42 on handlebar extensions 40 will the brake cable 44 contract so as to pull or pivot brake lever 74 about pivot point 82 thereby causing the brake 76 to disengage from the tread 78 on track assembly 36. It is felt that by operation of brake in this manner while opposite to normal hand brake type operations, the chair is provided with an added safety feature which prevents movement of the chair on a stairwell except when the handler or attendant of the chair depresses brake lever 42 on handlebar extensions 40.

Brake lever 74 is pivotally mounted to the track assembly 36 at pivot point 82. This pivotal mounting may be by means of a rivet or bolt depending on design criteria. While brake lever 74 is pivotally mounted to track assembly 36 stationary bar 80 is fixed to track assembly 36 either by weld or by bolt and does not move with respect to the track assembly 36. Brake spring 72 is bolted to brake lever 74 at the elongated end thereof and is fixed to track assembly 36 by nut 84.

Track assembly 36 comprises a pair of face plates 86 which are joined in parallel by virtue of bolts 88. Spaced around the outer edges of face places 86 are individual rollers placed perpendicular thereto, not shown. Over the rollers is placed tread 78 such that the tread is able to move in a continuous motion around face places 86 as chair 10 is raised or lowered along a stairway. The tread 78 is comprised of a grooved rubber-like material for traction and gripping the stairway. The track assembly 36 is designed so that it is the length of at least two stairsteps measured along the outer edges of the stairs along the stairway. This allows the track assembly 36 to rest on two outer edges of the stairs at a time and thus prevents the bumping of the rear wheel 24 as the chair 10 is raised or lowered along the stairway. The track assembly 36 is placed in the use position on mounting bracket 38 such that the outer edge of tread 78 is approximately tangent to wheel 24 so that the tread assembly 78 will engage the stairs as chair 10 is raised or lowered along the stairway. By "approximately tangent to wheel 24" it is meant that the outer edge of track assembly 36 lines up with the outer edge of wheel 24 as shown in FIG. 13.

Track assembly 36 has a length of approximately 36 inches in one embodiment. This length would provide a sufficient amount of room along the tread for the track assembly to engage at least two stair steps at a time as chair 10 is raised or lowered along the stairway. This eliminates the bumps and jolts commonly experienced when a standard chair with the large rear wheel 24 is tipped backwards and raised or lowered along a stairway. This helps provide for a smooth gliding motion up or down the stairway which, when controlled by the brake assembly provides a safe and efficient means for transporting a wheelchair-bound patient up or down a stairway. The length of track assembly can be varied according to varying stairwells As such customized versions of the apparatus can be made to accommodate different individual's needs.

Figure 3:
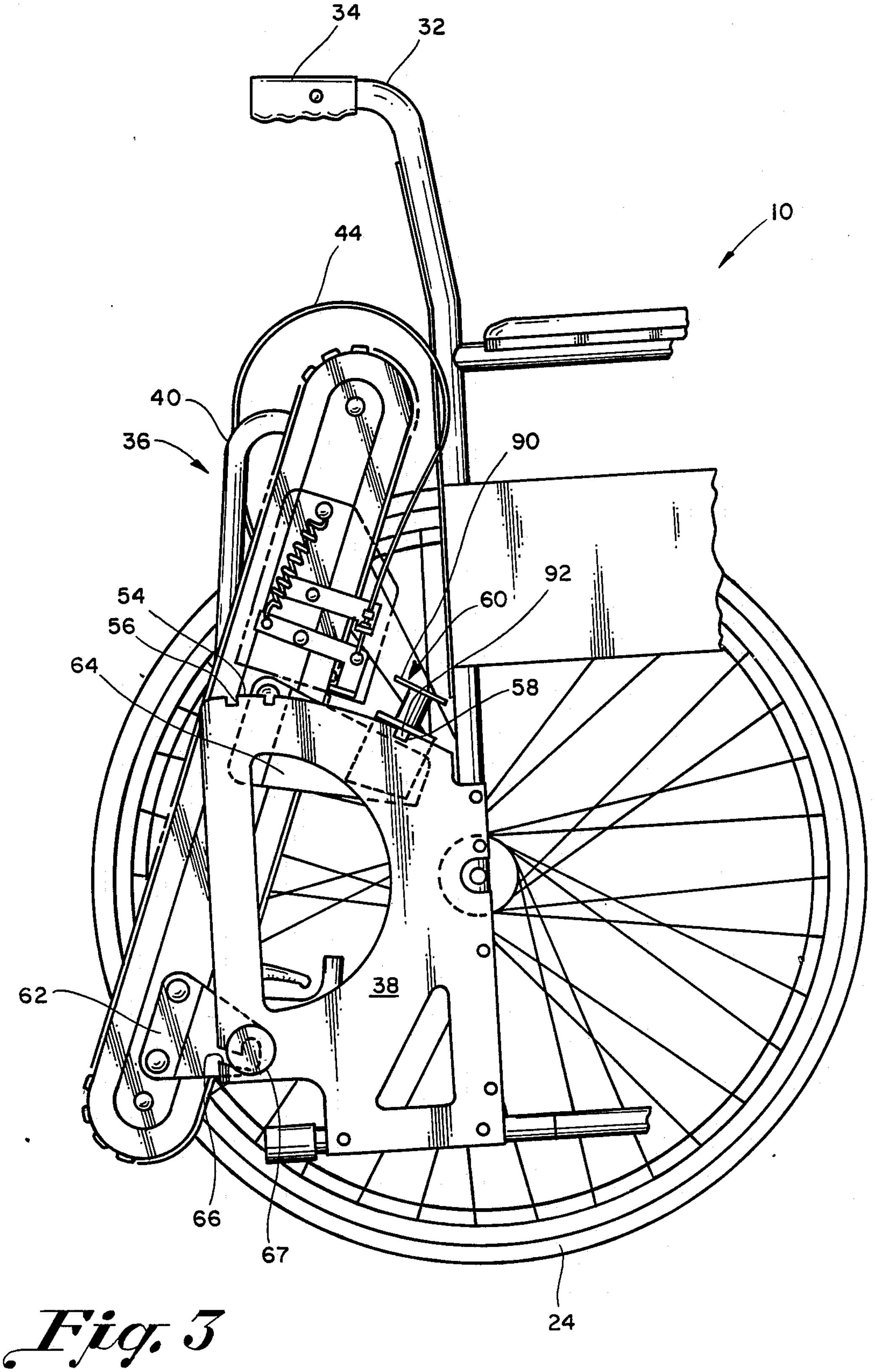
FIG. 3 shows the elongated tread assembly and extension handles in side view in the storage position, attached to a standard wheelchair.

FIG. 3 illustrates chair 10 with track assembly 36 in its retracted position when not in use. It should be noted that latch assembly 60 is in notch position 58 thereby drawing positioning bracket 64 and track assembly 36 inward along the upper section 54 of mounting bracket 38. It should be noted that in this retracted position the track assembly 36 is entirely self-contained, including handlebar extensions 40 and brake cable 44. Handlebar extensions 40 are removed from handlebars 32 and clipped to brackets on track assembly 36 as will be shown later. FIG. 3 shows the track assembly 36 out of the way of the operation of the chair 10 when in the retracted position such that the subject invention may be utilized with the chair at all times. It is seen from FIG. 3 that when the track assembly 36 is in the retracted position it does not interfere with the movability and handling of the chair. Also, if desired the entire assembly may be removed from the chair, leaving only mounting bracket 38 thereon. This is accomplished by lifting latch handle 90 which is spring loaded to keep latch 92 depressed in notch 58, or when in the use position, notch 56. By lifting latch handle 90, latch 92 is removed from the respective notch it is in allowing the entire assembly to pivot about pivot bracket 62 which is removably connected to cut out portion 66 by virtue of axle and washer assembly 67. Once the latch assembly 60 clears the upper section 54 of mounting bracket 38, the axle and washer assembly 67 can be removed from cut-out section 66 thereby removing the entire track assembly 36 from chair 10. The handlebar extensions would then be removed from the handgrips to restore the chair 10 to its original condition. An interesting aspect of the present invention is that it may be either entirely self-contained on chair 10 either when in use or not in use or may be easily removed from chair 10 when so desired. It should be noted that the track assembly 36 does not interfere with the operation of the chair either when in use or when in the retracted position.

It should be noted that while not shown on either FIG. 2 or 3 the subject invention is contemplated as having two parallel track assemblies 36, each attached to the vertical member of the rear side frame 20 on each side of the chair. This provides the lateral support to the chair 10 when it is used in conjunction with the subject invention to glide up or down a stairway.

As can be seen in FIG. 3, the track assembly 36 when rotated to the retracted position does not interfere with rear wheel 24 or use of the hand grips 34.

Figure 4:
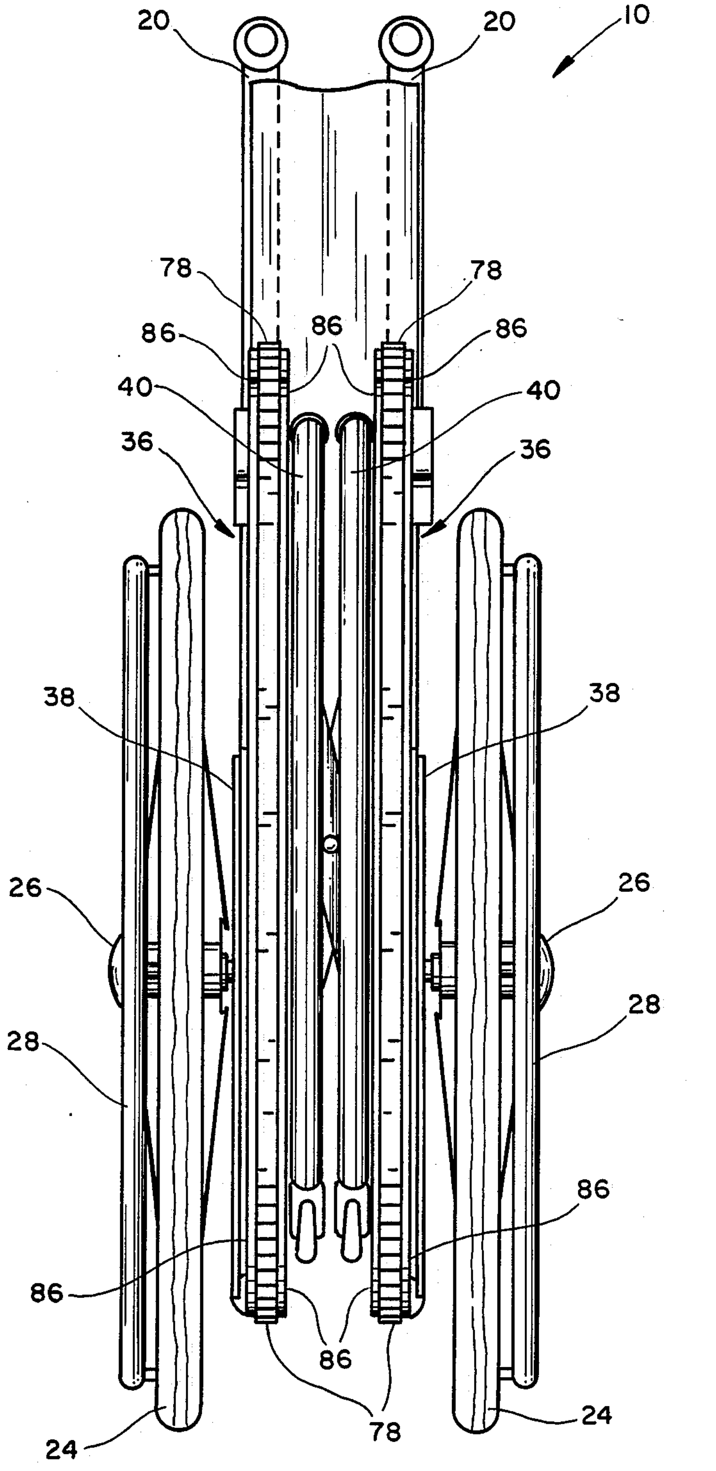
FIG. 4 shows a rear view of a standard wheelchair in its collapsed position having the present invention attached thereto.

FIG. 4 further illustrates that the track assembly 36 does not interfere with the chair 10 when it is in its collapsed mode. Most standard type chairs collapse for storage or transport. One of the objects of the present invention is to provide a means by which a chair may glide up or down a stairway that is attachable to the chair and yet will not interfere with the chair collapsing to its storage position. FIG. 4 shows a rear view of a standard chair 10 having rear wheels 24 and hand rail 28 attached thereto. Axle 26 is also shown. It should be noted that the two parallel track assemblies 36, each of which are secured to both of the vertical members of the side frame 20 are shown also in FIG. 4. Handle bar extensions 40 are shown in their clipped positions to track assemblies 36 which is their storage position when not in use. In FIG. 4, each track assembly 36 is shown in its retracted position similar to that shown in FIG. 3. FIG. 4 also shows the relationship of each track assembly 36 with respect to the mounting brackets 38 in that each bracket 38 is shown mounted to the exterior of each track assembly 36. Each track assembly 36 is shown with tread 78 located between face plates 86. Each track assembly 36 has a pair of face plates 86 bolted together as previously indicated with the tread 78 running continuously therearound.

Figure 5:
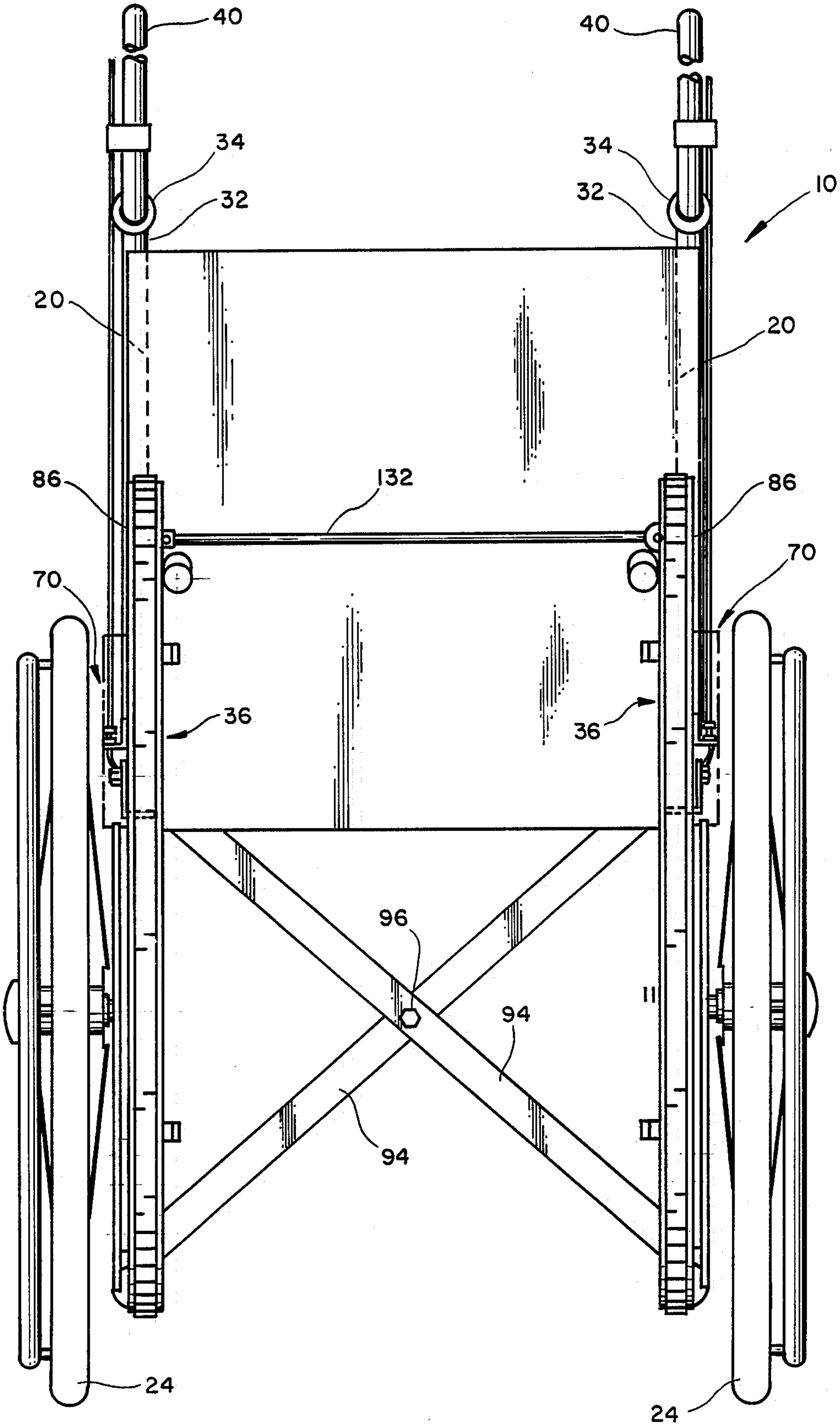
FIG. 5 illustrates the subject invention attached to a standard wheelchair, in rear view, where said chair is expanded for use.

FIG. 5 illustrates the chair 10 fully opened. Chair 10 has cross braces 94 which are generally part of a standard chair and which pivot with respect to each other about bolt 96, when the chair is collapsed as shown in FIG. 4. FIG. 5 shows a track assembly 36 mounted at each end of each vertical side rail 20. The relationship between track 36 and rear wheel 24 is further shown with respect to the rear view of FIG. 5. It should be noted that the brake assembly 70 is positioned on the outer side of each track assembly 36 along the outer face plate 86. As shown in FIG. 5, the track assembly 36 is rotated to its use position and thus handlebar extensions 40 are shown installed in hand grips 34 of handlebars 32.

Figure 6A:
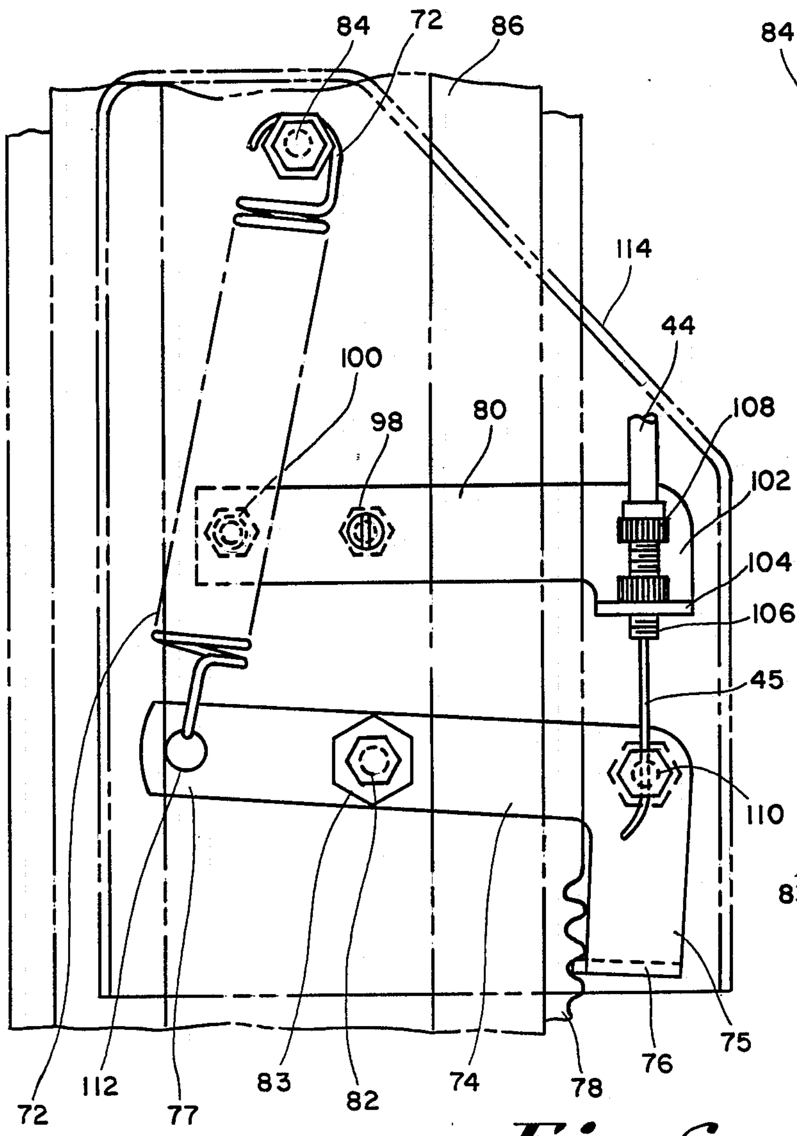
FIG. 6A illustrates a side view of the brake mechanism as used on the elongated tread assembly.

Referring now to FIGS. 6A, B, and C, the brake assembly 70 is shown in greater detail. FIG. 6A illustrates brake spring 72 secured to nut 84 which in turn is bolted to face plate 86.

Brake cable 44 is shown connected to stationary bar 80 which is fixed to face plate 86 by virtue of nut 98 and nut 100. Stationary bar 80 has end section 102 having a lip 104 thereon. Said lip 104 having an opening therein for receiving the threaded portion 106 of brake cable 44 as well as nuts 108. Nuts 108 serve to adjust brake cable 44 and brake wire 45 with respect to lip 104. Brake cable 44 is secured in the opening of lip 104 either by threading it into the opening or by threading nuts over section 106. Brake wire 45 projects from lip 104 to brake lever 74 where it is secured to outer end 75 at nut 110. Brake lever 74 is pivotally connected to face plate 86 at pivot point 82 by virtue of nut 83. Spring 72 is connected to brake lever 74 at end 77 at opening 112. Thus, it is seen that spring 72 is in tension, thus pulling upward on brake lever 74 causing it to pivot about pivot point 82. Brake 76, located at the outer end 75 of brake lever 74 communicates with tread 78. Brake 76 is formed as a lip which intersects between the grooved portions of thread 78 to stop the movement of tread 78 with respect to face plates 86. Since spring 72 is in tension, brake 76 is always engaged with tread 78 except when brake lever 42 on handlebar extensions 40 is depressed thereby pulling brake wire 45 through cable 44 and pivoting brake lever 74 with respect to pivot point 82. This releases the brake 76 from the tread assembly 78 thereby allowing the tread to move with respect to face plates 86. Since this further increases the tension in spring 72, once the brake lever 42 is released on handlebar 40, spring 72 which is in tension will pivot brake lever 74 such that the brake 76 re-engages tread 78 thereby stopping movement of the tread with respect to the face plates 86.

Figure 6B:
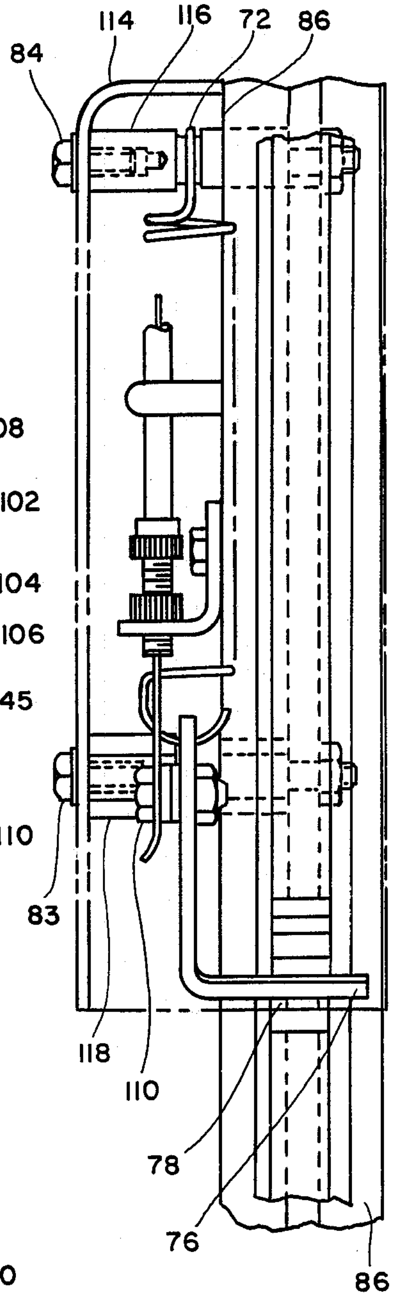
FIG. 6B illustrates a front view of the brake mechanism as used on the tread assembly.

Housing 114 is shown both in FIG. 6A and FIG. 6B as covering the brake assembly so as to prevent interference with the brake assembly by foreign components. This is added as a safety feature to help insure that the brake will operate properly as intended and without interference from or injury to people near the mechanism. FIG. 6B further shows the engagement of brake 76 with respect to tread 78 and face plates 86. Nut and bolt arrangement 84 is shown with respect to spacers 116 as not only securing spring 72 to face plate 86 but also securing housing 114 to face plate 86. Bolt 83 is also shown with respect to spacer 118 as providing the basis of a pivot point 82 for brake lever 74 and as providing a means by which housing 114 is further secured over the brake assembly.

Figure 6C:
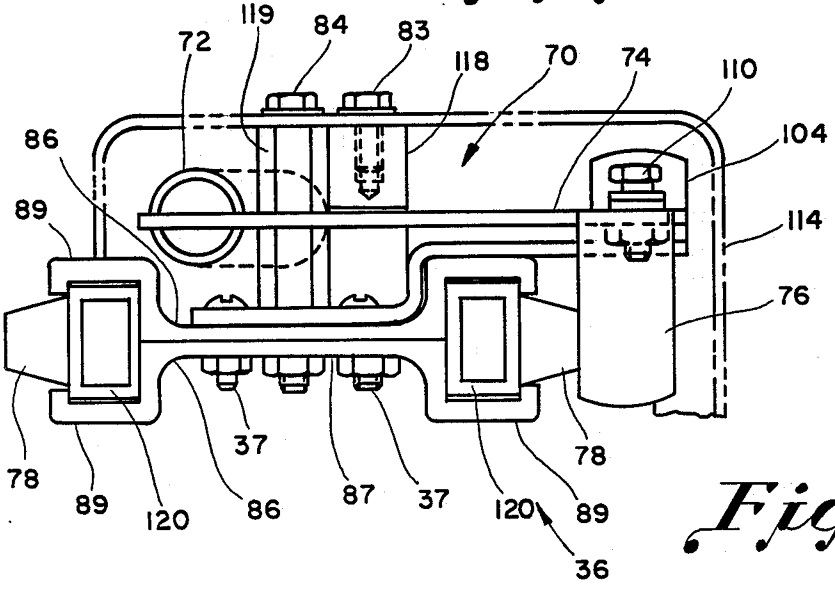
FIG. 6C illustrates a top view of the brake assembly as used on the elongated tread assembly.

FIG. 6C shown a top view of the track assembly 36 and the brake mechanism 70. It is seen in FIG. 6C that housing 114 completely surrounds the brake assembly and brake and joins face plate 86. FIG. 6C also illustrates the shape of face plates 86. It should be noted that face plates 86 join at center portion 87 where they are adjacent each other. Nuts and bolts 37 join face plates 86 together such that outer ends 89 of face plates 86 entrap rollers 120 and tread 78. Outer ends 89 of face plates 86 when assembled together in top view, as shown in FIG. 6C form a substantially C-shaped section such that tread 78 and rollers 120 are prevented from moving except in a rotary fashion about the outer edge of track assembly 36. Rollers 120 in one embodiment are comprised of plastic material and are cylindrical in shape. Rollers 120 have a diameter of approximately 0.500" inches and there are approximately 100 rollers spaced within the C-shaped section formed by outer ends 89 of face plates 86 around the track assembly 36. These rollers provide the means by which tread 78, which is a continuous piece of grooved rubber belting, glides within the C-shaped section of outer ends 89 providing the gliding motion for chair 10 as it ascends or descends a stairway. Brake assembly 70 is shown in FIG. 6C having spring 72 connected to brake lever 74. Bolt and nut arrangement 84, which includes a pair of spacers 119 is shown connecting both housing 114 to spring 72 and track assembly 36. Bolt 83 is shown providing a means by which spacers 118 connect to housing 114 and provide a pivot point 82 for brake lever 74. Spacers 118 and 119 space the brake lever 74 from the track assembly 36 and the housing 114. Brake 76 is shown disengaged with tread 78.

Figure 7:
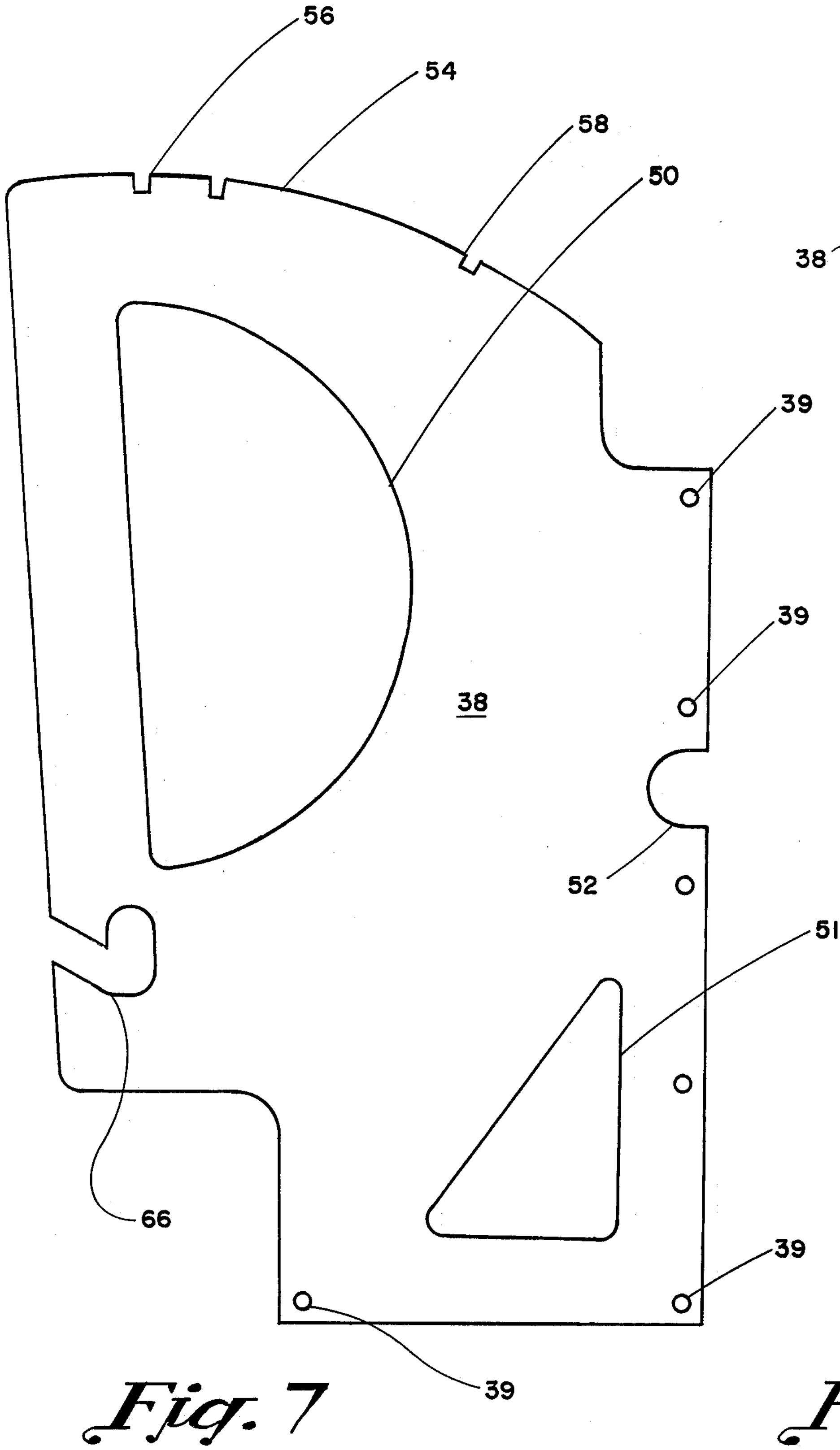
FIG. 7 is a side plan view of the mounting bracket.
Figure 8:
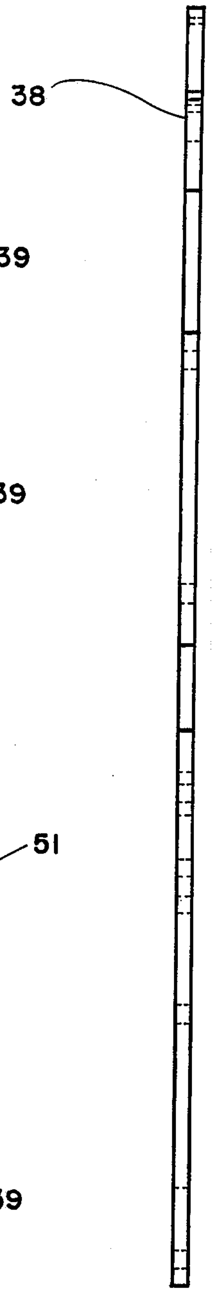
FIG. 8 is a front elevational view of the mounting bracket.

FIGS. 7 and 8 illustrate mounting bracket 38 in side and end views. Mounting bracket 38 has openings 50 and 51 cut therein for weight saving, yet still allows the bracket 38 to provide the necessary strength to support the track assembly 36 which is mounted thereto when mounting bracket 38 is secured to chair 10. FIG. 7 shows in side view the mounting bracket 38 with notch positions 56 and 58. Notch position 56 is used when the track assembly is extended and positioned for use. Notch position 58 is used when the track assembly 36 is mounted thereto and pivoted forward for storage. Cut-out section 66 is shown on the side of mounting bracket 38 which provides a means by which pivot bracket 62 is inserted therein and locked when the track assembly 36 is mounted thereon. Cut-out section 66 has an angled opening as shown to help prevent the pivot bracket from accidentally disengaging. Upper section 54 provides a means by which the latch assembly 60 moves along mounting bracket 38 from the use position to the retracted or storage position. Openings 39 in mounting bracket 38 provide a means by which mounting bracket 38 is secured to the vertical and rear member of side frame 20 of wheelchair 10. Cut-out section 52 is intended to receive axle 26 of the wheelchair 10. This provides additional means of support for mounting bracket 38 as it cups the axle 26.

FIG. 8 illustrates mounting bracket 38 in side view and illustrates its relative thickness with respect to the rest of he chair. It is felt that mounting bracket 38 should be manufactured of aluminum or stainless steel and should have a thickness of approximately 3/16 inches. When used with respect to a standard chair, mounting bracket 38 would have a width varying from a minimum of approximately 5 inches to a maximum of approximately 10 inches. It is felt that curved portion of upper section 54 would have a radius of 11 inches. Openings 39 are spaced approximately one inch apart to provide the best strength and security when mounted to the rear side frame 20.

Figure 9:
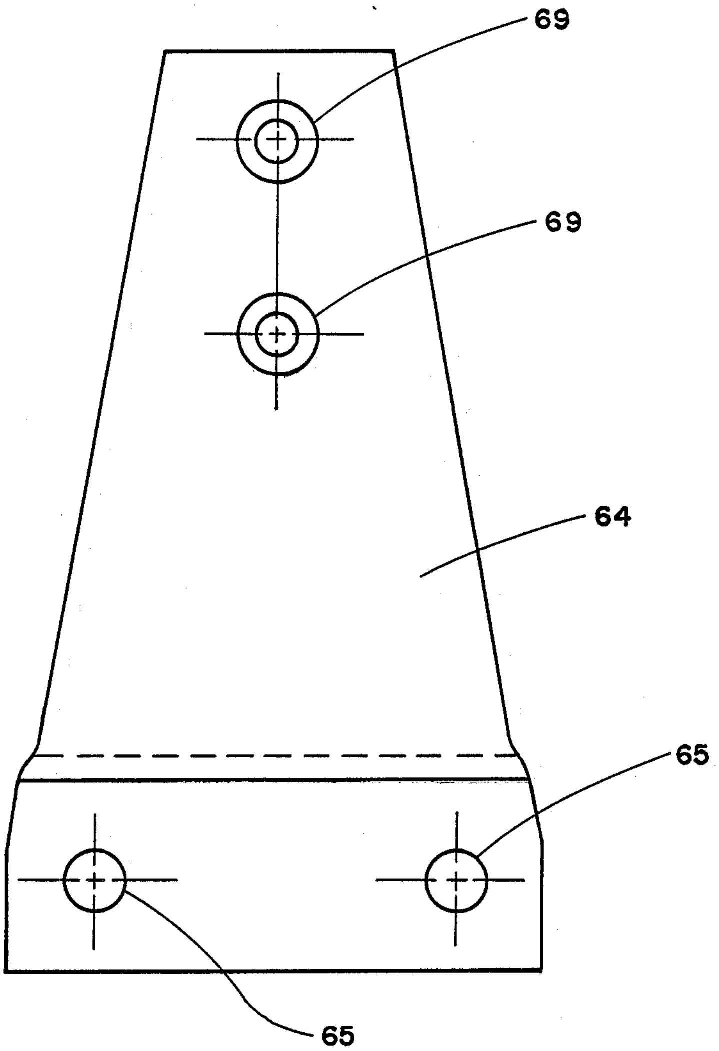
FIG. 9 is a side plan view of the positioning bracket.
Figure 10:
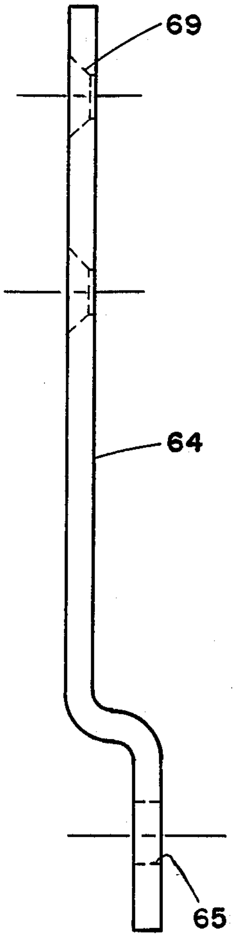
FIG. 10 is a front view of the positioning bracket.

FIGS. 9 and 10 illustrate the positioning bracket 64. It should be noted that positioning bracket 64 is secured to face plates 86 by virtue of openings 65 through which bolts are secured to the face plates 86. This further secures the pair of face plates 86 together as well as provides a means by which positioning bracket 64 is secured thereto. Openings 69 provide a means by which the latch assembly 60 is secured to positioning bracket 64. The bend in positioning bracket 64 shown in FIG. 10 allows the positioning bracket 64 to meet the center portion 87 of face plates 86 and yet clear the C-shaped section at the outer end 89 of face plate 86. Positioning bracket 64 is made of aluminum or stainless steel and is approximately ¼ inch thick. It has an approximate width at the maximum point of ¾ inch and an approximate length of 6 inches. Further, the positioning bracket has a taper therein to cut down on material usage. Openings 69 are shown in FIG. 10 countersunk to provide for a flat machine screw to be used to secure latch assembly 60 to the positioning bracket 64. This allows the latch assembly 60 to be secured to the positioning bracket 64 without providing any obstructions as would be experienced with a raised head nut or bolt used therein.

Figure 11:
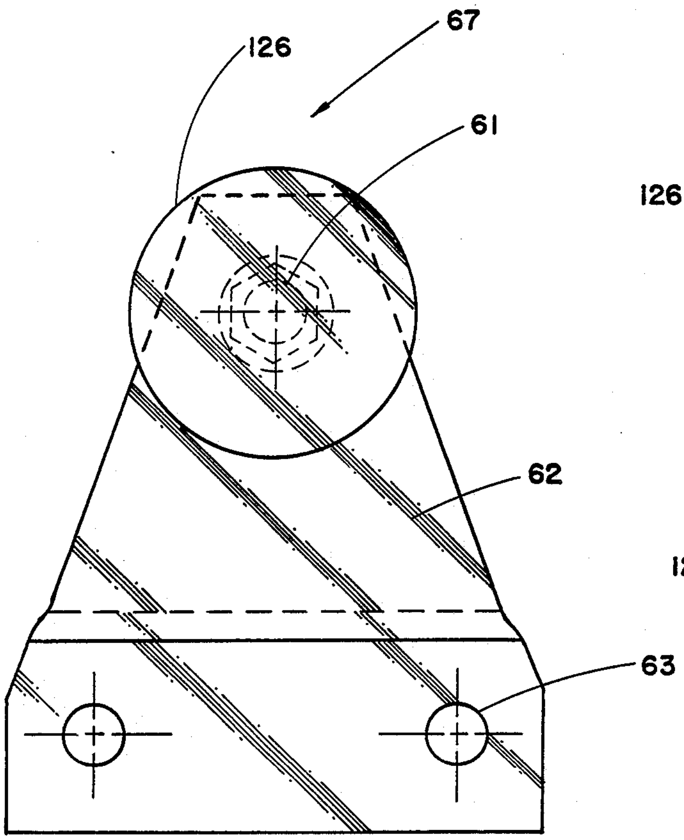
FIG. 11 is a side plan view of the pivot bracket.
Figure 12:
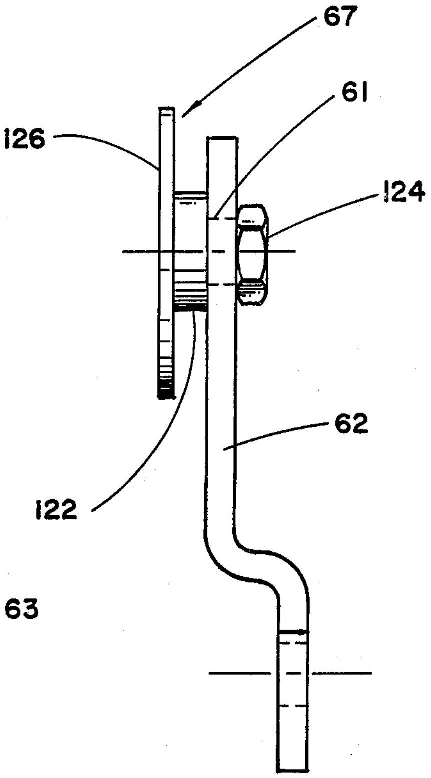
FIG. 12 is a side plan view of the pivot bracket.

FIGS. 11 and 12 illustrate a front and side view respectively of the pivot bracket 62. FIG. 12 shows a similar bend in pivot bracket 62 as that shown in positioning bracket 64 in FIG. 10, which is necessary to allow openings 63 to meet with the center section 87 of face plate 86 and yet clear the outer C-shaped section of end 89 of face place 86. Pivot bracket 62 has opening 61 therein which has the axle and washer assembly 67 connected thereto. Axle and washer assembly 67 has washer and spacer 122 secured thereto by virtue of bolt 124 and has rounded hub 126 joined thereon. This spacer assembly 67 provides a means by which the pivot bracket is joined to cut-out portion 66 of mounting bracket 38. The enlarged rounded portion 126 provides a catch preventing the pivot bracket 62 from moving laterally with respect to mounting bracket 38 and spacer 122 provides a pivotal point or rotational area for the cut-out portion 66. Pivot bracket 62 is joined to face plate 86 at openings 63 by virtue of bolts (not shown). The spacer assembly 67 is shown in FIG. 11 as having rounded portion 126 spaced with respect to the end of pivot bar 62.

FIG. 13 illustrates the chair 10 in use on a stairwell 48. It should be noted that the track assembly 36 engages at least two outer ends of the steps of stairwell 48 at a time. The length of track assembly 36 is designed such that while chair 10 is gliding up or down the stairway it will always engage at lease two stairsteps at a time. This prevents the bumping or jolting commonly experienced when a standard chair is raised or lowered down a stairwell. The position of handlebar extensions 40 should also be noted. Handlebar extensions 40 project out of handlebars 32 and hand grips 34 so as to provide a means by which a handler of the chair does not have to bend over at an uncomfortable angle as the chair is tipped backwards. This is a problem with the design of standard chairs used without any type of apparatus for assistance up and down a stairway. The handler is bent over at approximately a 90 degree angle (the weakest anatomical strength position) as he would hold the hand grips 34 in an attempt to control the chair up or down the stairwell. To provide a safe means which the present invention is practiced, it is felt that a handler would grip the handlebar extensions 40 at hand grips 43 and depress brake lever 42 to release the brake 76 brake assembly 70. This would release track 78 and thereby allow movement of the track with respect to the face plates 86 and thus movement of chair 10 along the stairway. A second attendant or handler would grip the front forks 19 to which front caster wheels 12 are joined to further steady the chair.

Handlebar extensions 40 are manufactured of approximately ⅞ inch tubular stainless steel and have a length of approximately 38 inches.

Figure 14:
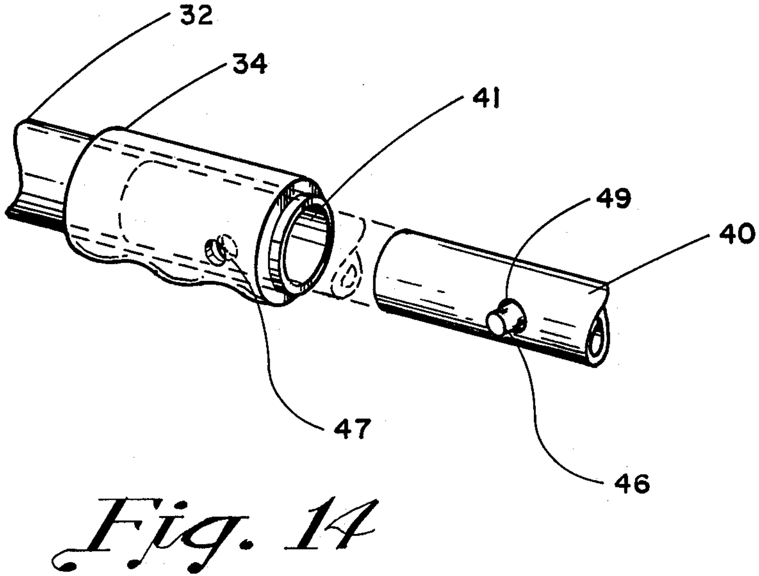
FIG. 14 is a perspective view of the hand grip and a portion of the elongated handlebar assembly.

FIG. 14 illustrates in exploded view the assembly of handlebar extensions 40 into hand grips 34 of handlebars 32. Handlebar extensions are received in the opening 41 in handlebars 32 where spring loaded pin 46 connects with opening 47 in handlebars 32. Spring loaded pin 46 is spring loaded in tension such that the pin 46 is projected out of opening 49 in handlebar extensions 40. Pin 46 is rounded so as to be depressed upon entry into opening 41 of handlebars 32. Upon mating with opening 47 in handlebars 32, pin 46 is released thereby locking handlebar extensions 40 into handlebar 32. A second pin assembly 46 could be provided in handlebars 40 to engage a second opening 47 in handlebars 32 (not shown) for the purpose of adding extra stability to the handlebars 40 when inserted into handlebars 32. It is anticipated that handlebar extension 40 would be inserted approximately 3½ inches into handlebars 32. The longer the portion of handlebar extension 40 that is inserted to handlebar 32 the more secure and stable the handlebar extensions 40 will be with respect to movement of the chair 10. While only a portion of handlebar extensions 40 are shown inserted into handlebars 32 it is anticipated that for the safe practice of the invention a significant length of handlebar extension 40 should be inserted into handlebar 32 through opening 41.

Figure 13A:
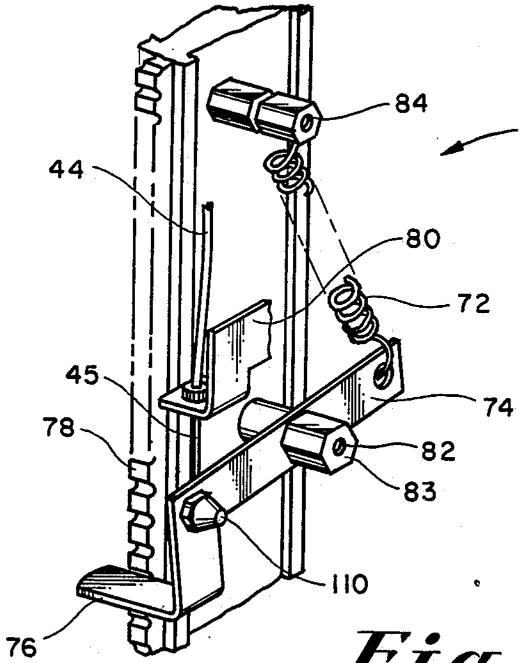
FIG. 13A is a side perspective view of the brake mechanism shown circled in FIG. 13.
Figure 13:
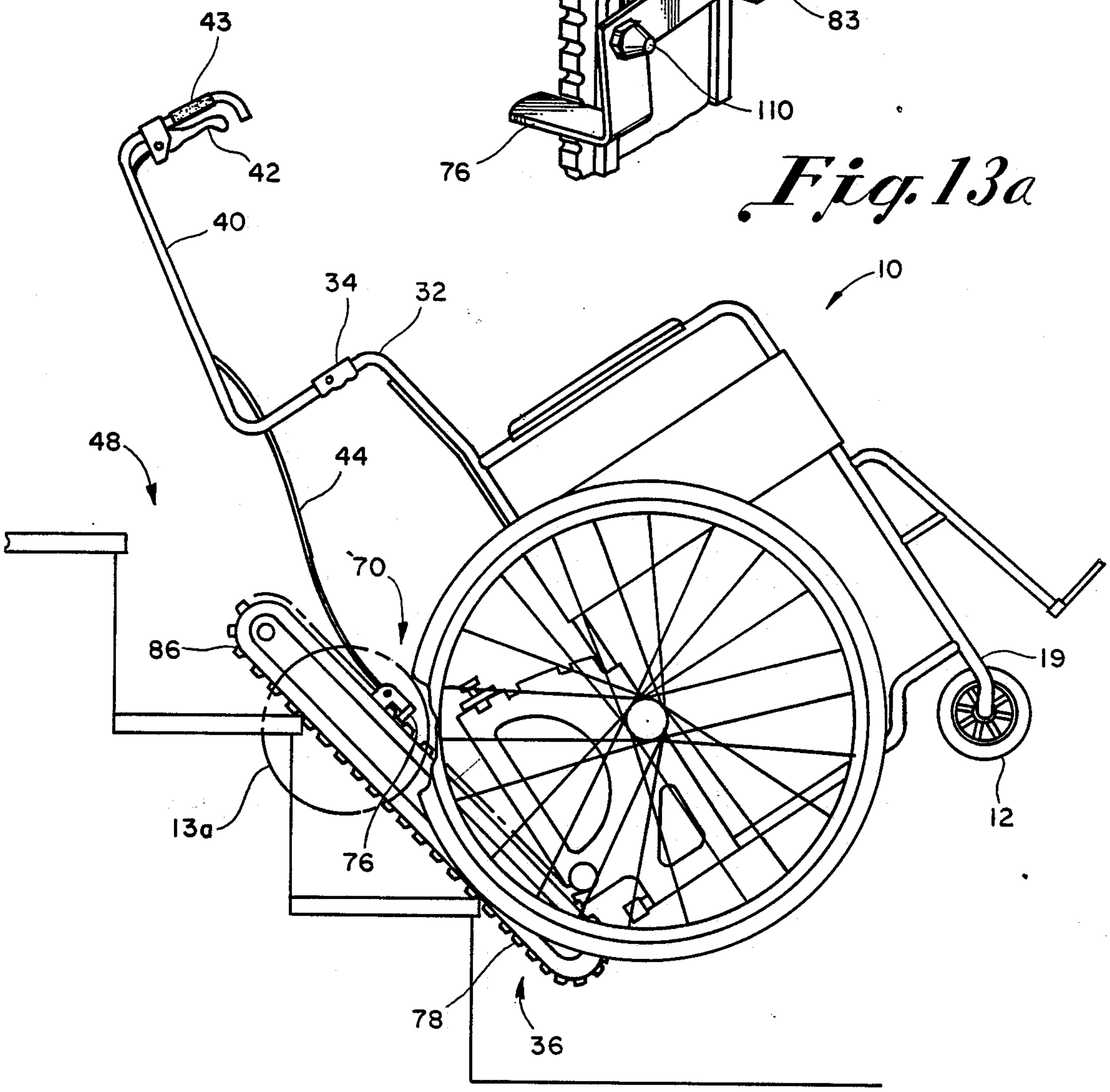
FIG. 13 is a side view of the wheelchair in use descending a stairway.

FIG. 13A illustrates in perspective view the operation of the brake assembly 70. Brake lever 74 is shown at pivot point 82 and connected thereby by bolt 83. Brake 76 is shown engaged with tread 78 and brake wire 45 is shown connected to brake lever 74 by virtue of nut 110. Stationary bar 80 is shown connected to brake cable 44 for the purpose of providing a means by which cable 44 is positioned and held stationary with respect to the movement of brake wire 45 as brake lever 42 is depressed. Again, spring 72 is shown in tension thereby exerting force in the direction of nut 84 on brake lever 74.

With respect to the handlebar extensions 40 shown in FIG. 13, it should be noted that the shape of handlebar extension which is shown in FIG. 13 and throughout the drawings as being substantially C-shaped may be changed to other similar type shapes depending on what is found to be best for control of the chair when in use on a stairway.

Figure 15:
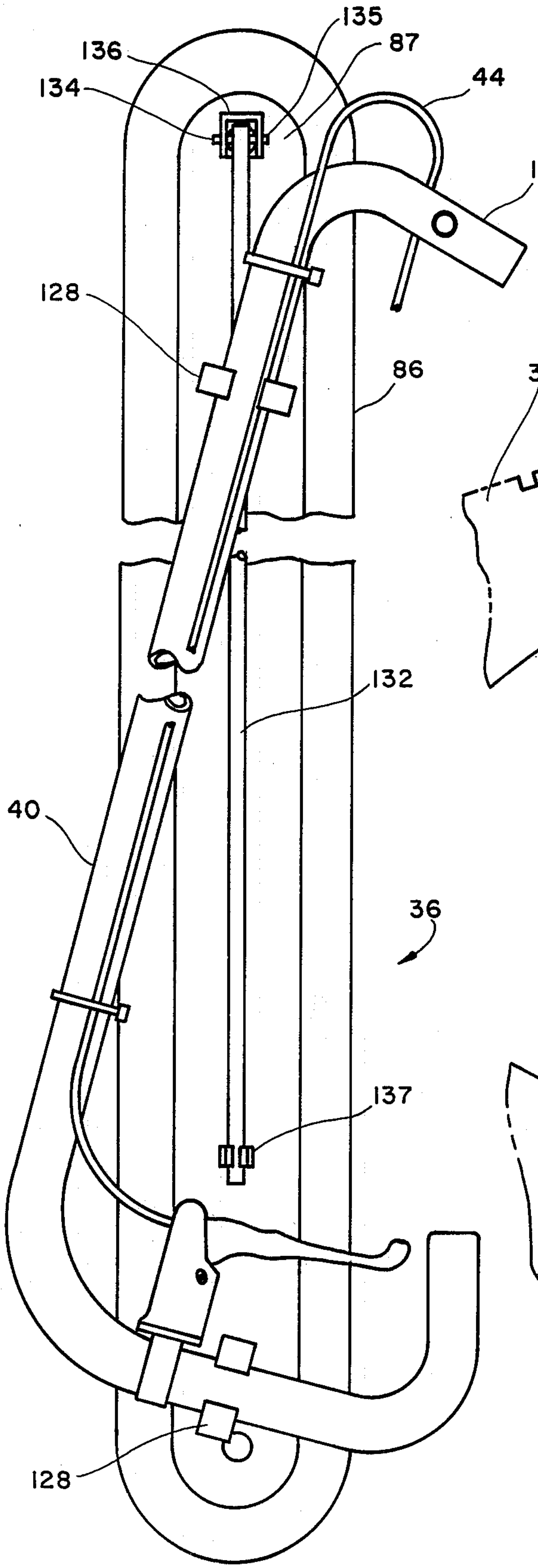
FIG. 15 is a side view of the elongated track assembly having the extension handles attached thereto in their storage position.

FIG. 15 illustrates the track assembly 36 removed from mounting bracket 38. As has been discussed previously, the track assembly 36 is removable from the mounting bracket 38. Further, handlebar extensions 40 are also removable from handlebars 32. As such, the entire apparatus may be stored together. FIG. 15 illustrates the method in which handlebar extensions 40 are secured to track assembly 36. Clips 128 are secured to faceplates 86 at center portion 87.

The view in FIG. 3 of the track assembly in its retracted position also shows handlebar extensions 40 secured in the manner shown in FIG. 15 to the track assembly 36. This illustrates the fact that the handlebar extensions may be secured and carried with the track assembly whether it is to be retracted in its retracted position on chair 10 or whether it is to be removed in its entirety from the mounting bracket 38 and stored elsewhere. An interesting feature of the mounting arrangement of handlebar extensions 40 on track assembly 36 is that rounded portion 130 of handlebar extensions 40 extends past track assembly 36 and provides a means by which the entire assembly may be gripped by a person lifting the track assembly 36. This rounded portion 130 when clipped as shown to track assembly 36 provides a "handle" allowing the entire assembly to be lifted and carried. Clips 128 are secured to face plate 86 by virtue of nuts and bolts, not shown.

FIG. 15 also illustrates support rod 132 that is pivotally connected at pivot point 134 by virtue of axle 135 and housing 136. Support rod 132 when not in use is clipped to face plate 86 by virtue of clip 137. Support rod 132 when in use is pivoted at pivot point 134 about axle 135 such that it mates with a like clip 137 on the opposing track assembly to provide a horizontal support for the track assemblies 36 when in use. Support rod 132 is further shown in FIG. 5 connecting track assemblies 36 and thereby providing lateral support thereto.

Figure 16:
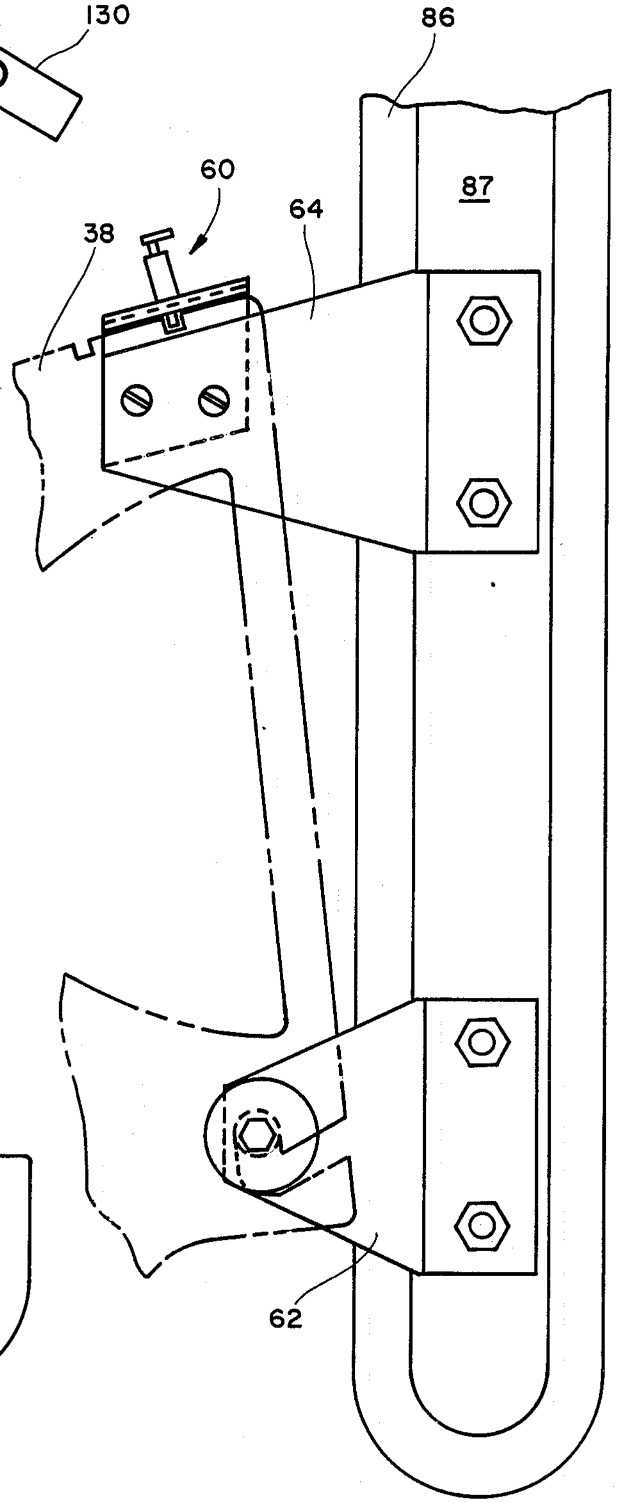
FIG. 16 is a side section view showing the positioning bracket joined to the mounting bracket.

FIG. 16 illustrates the positioning bracket 64 and the pivot bracket 62 connected to mounting bracket 38. The latch assembly 60 is also shown in more detail. FIG. 16 illustrates the angle between the outer edge of face plate 86 and the tread with respect to the outer edge of mounting bracket 38 when the track assembly 36 is latched through latch assembly 60 in its "use" position.

Figure 17:
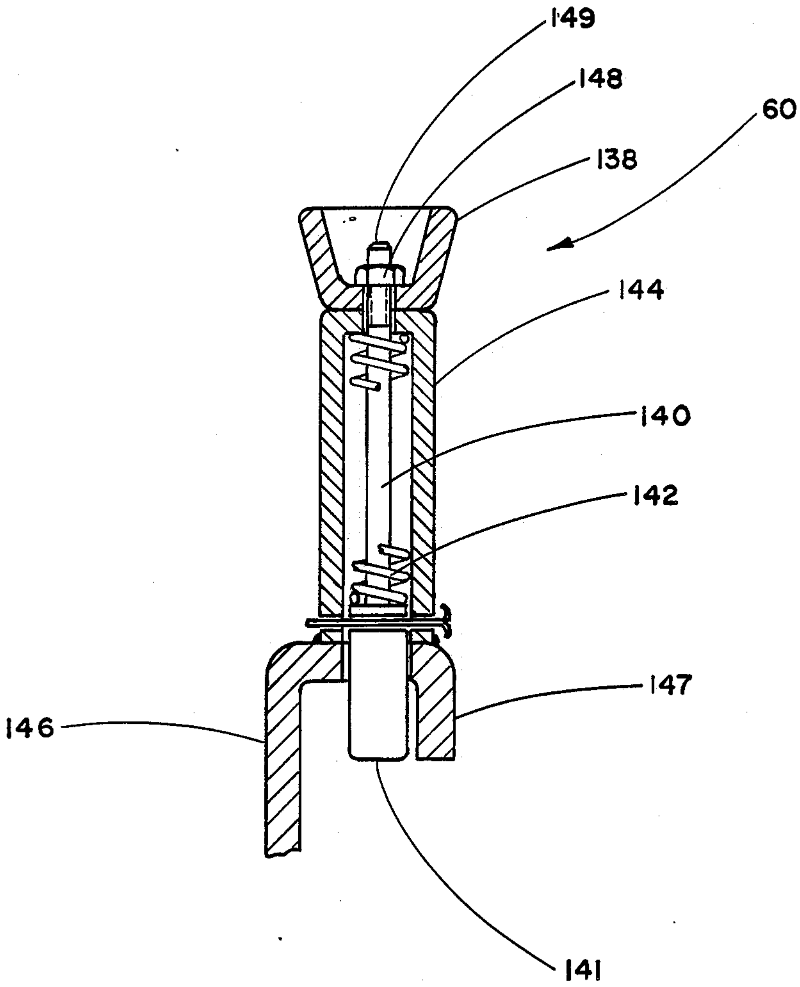
FIG. 17 illustrates a side section view of the lock pin and housing used to secure the positioning bracket and the elongated tread assembly to the "storage" position or the "use" position on the mounting bracket.

FIG. 17 illustrates in section view the latch assembly 60. Latch assembly 60 has handle portion 138 which in FIG. 17 is shown as a circular cone or substantially cone shaped piece. In other views, handle 138 is a elongated handle joined perpendicularly to pin 140. It is felt that either embodiment for the handle portion 138 will provide a sufficient grasping means for operating the latch. Spring 142 provides tension within housing 144 and encircles the length of pin 140. Pin 140 has end 141 which mates with notches 56 and 58 in mounting bracket 38. Housing 144 has plate 146 formed thereon. Plate 146 is bolted to positioning bracket 64 as shown in FIG. 16. To operate latch assembly 60, handle 138 is pulled up on, thereby compressing spring 142 and lifting pin 140 out of either notch 56 or notch 58. Latch assembly 60 is then pivoted along with positioning bracket 64 and thus track assembly 36 to either of the notch positions (or is removed altogether from the mounting bracket 38). Lip 147 projects over the end of mounting bracket 38 thereby providing a catch and a means for preventing the latch assembly from laterally moving with respect to mounting bracket 38. Thus, pin 141 prevents movement of the track assembly along the upper section 54 of plate 38 and lip 147 prevents the lateral movement of the track assembly on mounting bracket 38. Pin 141 is secured to handle 138 by nut 148 which fits over threaded end 149 of pin 140.

Plate 146 of latch assembly 60 is anticipated of being comprised of 304 stainless steel having a thickness of approximately $\frac{1}{8}$ inches. The housing 144 which contains spring 142 is further comprised of 304 stainless steel and is formed in a cylindrical shape to better house spring 142. Spring 142 is designed to have a specific pound force of tension when compressed as shown in FIG. 17. Pin 141 is comprised of 1018 steel which is felt to be suitable to lock positioning bracket 64 and track assembly 36 along mounting bracket 38.

The invention is not limited to the particular details of construction of the device depicted and described above. Other modifications and applications are contemplated. For example, a different brake assembly could be used as well as a different handlebar extension 40 design. The locking pin arrangement 46 used to connect handlebar extension 40 to handlebars 32 could be comprised of a different assembly such as a notch assembly which would fit in a slot cut in opening 41 of handlebars 32. The shape of mounting bracket 38 could be changed to accommodate different angles desired for the track assembly 36.

It is anticipated that track assembly 36, when in use, will form an approximate 60 to 70 degree angle with the horizontal and an approximate 20 to 30 degree angle with the vertical. It is felt that these angles comprise the optimum operating condition for a chair on a stairwell. Different operating angles may be used depending on the height of the handler of the wheelchair which will affect how far, if at all, he must bend over to control the chair once it is tipped backwards. To accomplish this, varying notches along the upper portion 54 of mounting bracket 38 could be placed thereby allowing for a degree of adjustability of track assembly 36 with respect to the angle it forms on the horizontal or vertical. The spacer assembly 67 used to secure pivot bracket 62 to mounting bracket 38 could be changed to a nut and bolt arrangement whereby the pivot bracket 62 is still allowed to pivot with respect to mounting bracket 38. This would entail more work in the assembly of the track assembly to the mounting bracket 38. Certain other changes may be made in the above-described device without departing from the true spirit and scope of the invention herein involved. It is intended therefore that the subject matter in the above description be interpreted as illustrative and not in a limiting sense.

I claim:

1. An apparatus for a wheelchair to assist the wheelchair and an occupant thereof to ascend or descend a stairway, comprising a pair of elongated track assemblies, each track assembly having a continuous tread rotatably spaced therearound such that the tread moves with respect to the track, each track assembly removably mounted to a mounting bracket, each said mounting bracket rigidly secured to at least one frame member of the wheelchair; each said track assembly mounted to each mounting bracket by a means for pivoting the track assembly with respect to the mounting bracket and by a means for adjusting the angle of the track assembly with respect to the mounting bracket; each said track assembly positioned with respect to the rear wheels of the wheelchair such that as the wheelchair is raised or lowered along a stairway having a series of individual stair steps, the track assemblies carry the weight of the wheelchair along the individual stair steps.

2. The apparatus of claim 1 where the means for pivoting each track assembly with respect to each mounting bracket comprises a pivot bracket rigidly mounted to the track assembly at one end thereof and pivotally attached to the mounting bracket by a means for pivotal attachment such that the track assembly and pivot bracket pivot about a fixed point on the mounting bracket.

3. The apparatus of claim 2 where the means for pivotal attachment comprises a tubular shaped spacer having two ends, said spacer connected to the pivot bracket at one end thereof and having an enlarged circular disc secured to the other end thereof, an opening in the mounting bracket to receive the tubular spacer, said opening slanted downward such that gravity will help to maintain the tubular spacer in the opening and such that the enlarged disc will restrict lateral movement of the pivot bracket with respect to the mounting bracket, said opening permitting the withdrawal of the tubular spacer to remove the track assembly and pivot bracket from the mounting bracket.

4. The apparatus of claim 1 where the means for adjusting the angle of each track assembly with respect to each mounting bracket comprises a positioning bracket rigidly mounted to the track assembly, and adjustably attached to the mounting bracket by a means for adjusting the positioning bracket with respect to the mounting bracket.

5. The apparatus of claim 4 where the means for adjusting the positioning bracket comprises a latch assembly mounted at an end of the positioning bracket, said latch assembly having a handle for operating the latch assembly, a pin connected to the handle and a spring mounted in compression within a housing over said pin; said housing having an elongated plate at one end and a lip at another end, said lip parallel to the elongated plate, said pin having an end projecting between the elongated plate and the lip;

a series of spaced notches on the mounting bracket, said notches along an upper edge of the mounting bracket, each said notch able to receive the end of the pin of the latch assembly such that the mounting bracket fits between the lip and the elongated plate of the latch assembly thereby preventing lateral movement of the latch assembly and positioning bracket with respect to the mounting bracket, yet allowing the latch assembly and positioning bracket to move along the upper edge of the mounting bracket to engage the individual notches and thereby position the track assembly with respect to the mounting bracket when the handle is lifted and thereby lifts the end of the pin out of one of the notches to move the track assembly along the mounting bracket.

6. The apparatus of claim 5 where the mounting bracket has at least two spaced notches on the upper edge of the mounting bracket, one of said notches at an outer end thereof and providing a use position for the track assembly, and a second notch position providing for a storage position for the track assembly.

7. The apparatus of claim 1 where the means for pivoting the track assembly and the means for adjusting the track assembly each are removably attached to the mounting brackets.

8. The apparatus of claim 1 where each of said mounting brackets comprise flat metal plates and each having interior cut-out portions such that the overall weight of the plates is reduced.

9. The apparatus of claim 1 where each of the mounting brackets have spaced openings to receive screws for mounting the brackets to the frame of the wheelchair and each mounting bracket has an exterior cut-out portion to receive an axle of the rear wheels of the wheelchair thereby providing a support for the mounting brackets.

10. The apparatus of claim 1 where each track assembly has a means for braking the tread to stop the tread from rotating around the track by applying force directly to the tread, thereby preventing the wheelchair from ascending or descending a stairway.

11. The apparatus of claim 1 where the wheelchair has a pair of handlebars formed on the frame thereof, said handlebars having attached thereto by a means for attachment, a pair of elongated handlebars, said elongated handlebars each substantially "C" shaped and each projecting over said handlebars of said wheelchair, each pair of elongated handlebars having a handgrip mounted at an outer end such that the elongated handlebars provide support for a handler of the wheelchair.

12. The apparatus of claim 11 where the means for attachment comprises a pin moveably mounted in the elongated handlebars, said pin spring-loaded such that the spring constantly projects the pin outward from the elongated handlebars, said pin matable with an opening in the wheelchair handlebars such that when the end of the elongated handlebars are inserted into the end of the wheelchair handlebars the pin mates with the opening thereby locking the elongated handlebars to the wheelchair handlebars.

13. The apparatus of claim 11 where the elongated handlebars have a means to control a brake adjacent the handgrips.

14. The apparatus of claim 1 where each track assembly comprises a pair of plates joined together at a center section, forming a continuous, enclosed area around the center section, and forming a guide path for a tread, a series of tubular-shaped rollers spaced in the enclosed area, a flexible continuous tread mounted over the rollers, said tread projecting out of the enclosed area and in the guide path such that the tread is free to rotate about the plates and over the rollers.

15. An apparatus for attachment to a wheelchair to assist the wheelchair in ascending or descending a stairwell, said apparatus comprising a pair of elongated track assemblies removably secured to a pair of mounting brackets, said mounting brackets each rigidly fixed to a frame member of the wheelchair and each adjacent one of a pair of rear wheels of the wheelchair, such that each mounting bracket is parallel to the other and to the rear wheels of the wheelchair thereby causing the track assemblies to be mounted in parallel to each other, each elongated track assembly having a continuous, flexible tread rotatably mounted therearound such that the tread will freely rotate around the track, a means connected to each track assembly for pivoting each track assembly with respect to each mounting bracket and a means connected to each track assembly for adjusting each track assembly with respect to each mounting bracket; such that the means for adjusting each track assembly cooperates with the means for pivoting each track assembly and positions each track assembly in either a use position on the mounting bracket or a storage position on the mounting bracket and such that when positioned in the use position the tread of each track assembly is adjacent each rear wheel of the wheelchair and contacts individual stairs of the stairwell as the wheelchair is raised or lowered thereon.

16. The apparatus of claim 15 where one of the track assemblies has an elongated bar having two ends, said bar pivotably mounted to the track assembly at one end, the other of said track assemblies having a clip thereon for receiving the second end of the elongated bar, such that the elongated bar forms a brace between the two track assemblies to provide security against lateral movement of the track assemblies with respect to the wheelchair.

17. The apparatus of claim 15 where the means for pivoting each track assembly comprises a pivot bracket having a substantially flat planar area and rigidly fixed to the track assembly, said pivot bracket having an outer end and a tubular spacer attached thereto at said outer end, said tubular spacer having an enlarged circular disc attached thereto and parallel to the substantially flat planar area of the pivot bracket, said mounting bracket having an opening therein to receive the tubular spacer of the pivot bracket, said opening slanted downward and having a notch therein to removably capture the tubular spacer in the mounting bracket and thereby allow the pivot bracket and attached track assembly to pivot about a fixed point on the mounting bracket.

18. The apparatus of claim 15 where the means for adjustment of each track assembly comprises a positioning bracket rigidly fixed to the track assembly and having a latch assembly mounted thereon, said latch assembly comprising a housing having a lip extending therefrom and an elongated plate parallel to the lip and extending from the housing, a pin movably mounted in the housing and having an end extending between the lip and the elongated plate, a spring mounted in compression with the housing and around the pin such that the spring forces the pin end constantly outward of the housing, a handle connected on the pin for moving said pin within the housing, said pin end matable with a series of spaced notches on an upper edge of the mounting bracket each of said notches defining either the use position or the storage position for the track assembly, such that the mounting bracket fits between the lip and the elongated plate of the housing with said pin end received into one of said notches thereby locking the track assembly onto the mounting bracket and preventing lateral movement of the track assembly with respect to the mounting bracket.

19. The apparatus of claim 15 where a pair of elongated handlebars are provided for insertion into a pair of handlebars on the wheelchair to provide additional security in the operation of the wheelchair on a stairwell, each of said elongated handlebars having a substantially C-shaped end projecting over said handlebars of said wheelchair each pair of elongated handlebars having a handgrip thereon and a means for attaching said elongated handlebars to the wheelchair handlebars, said elongated handlebars having a means for controlling a brake assembly thereon.

20. The track assembly of claim 15 wherein each track assembly has a brake located thereon to stop movement of the tread with respect to the track assembly, by applying force directly to the tread.

21. The apparatus of claim 19 where the elongated handlebars are removable from the wheelchair handlebars and are each attachable to a track assembly when the track assembly is either attached to the mounting bracket or removed therefrom such that when the track assemblies are removed therefrom and the elongated handlebars are attached thereto, the elongated handlebars form a handle to lift and carry each track assembly and attached elongated handlebar.

22. The apparatus of claim 15 where the means for pivoting each of the track assemblies with respect to the mounting brackets and the means for adjusting each of the track assemblies with respect to the mounting brackets are removably attached to the mounting brackets thereby allowing both of the track assemblies to be removed from the mounting brackets and the wheelchair.

23. A wheelchair for transporting an occupant therein having means for assisting the wheelchair and occupant to ascend or descend a stairway, said stairway having individual stairsteps thereon, said wheelchair having a frame, a seating area for said occupant formed in said frame, two front wheels connected to the front of the frame such that the front wheels are parallel to each other, two rear wheels connected to the frame, each of said rear wheels having an outer circular end such that the rear wheels are parallel to each other and handgrips formed on the frame for the guiding and pushing of the wheelchair and occupant by an attendant; said means for assisting the wheelchair and occupant in ascending and descending the stairway comprising a pair of elongated track assemblies, each track assembly having a glide means mounted thereon, each said track assembly pivotally mounted to a mounting bracket, said mounting bracket rigidly fixed to the frame of the wheelchair adjacent one of the rear wheels of the wheelchair and parallel to said rear wheel, each said track assembly adjustable from a use position to a storage position by a positioning bracket attached to each track assembly and selectively engageable with each said mounting bracket such that each positioning bracket locks each track assembly in either said use position or said storage position, each said track assembly having a length sufficient to contact at least two stairsteps on said stairway and said track assemblies mounted to the mounting bracket so as to position the glide means adjacent the outer circular ends of the rear wheels, when the track assemblies are in the use position such that each of the track assemblies support the wheelchair and occupant on the individual stairsteps and allows the wheelchair to ascend or descend the stairway.

24. The wheelchair of claim 23 where the guide means comprises a series of spaced rollers mounted adjacent one another on the track assembly, a flexible tread rotatably mounted over the rollers so as to permit the tread to rotate around the track assembly as the wheelchair and occupant are moved over the stairway.

* * * * *